United States Patent
Chou

(10) Patent No.: US 11,917,527 B2
(45) Date of Patent: Feb. 27, 2024

(54) RESOURCE ALLOCATION AND ACTIVATION/DEACTIVATION CONFIGURATION OF OPEN RADIO ACCESS NETWORK (O-RAN) NETWORK SLICE SUBNETS

(71) Applicant: Intel Corporation, Santa Clara, CA (US)

(72) Inventor: Joey Chou, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 188 days.

(21) Appl. No.: 17/238,438

(22) Filed: Apr. 23, 2021

(65) Prior Publication Data

US 2021/0258866 A1 Aug. 19, 2021

Related U.S. Application Data

(60) Provisional application No. 63/022,266, filed on May 8, 2020, provisional application No. 63/020,381, filed on May 5, 2020.

(51) Int. Cl.
| | |
|---|---|
| *H04W 48/16* | (2009.01) |
| *G06N 20/00* | (2019.01) |
| *H04W 24/10* | (2009.01) |
| *H04W 48/18* | (2009.01) |
| *H04W 92/12* | (2009.01) |

(52) U.S. Cl.
CPC .......... *H04W 48/16* (2013.01); *G06N 20/00* (2019.01); *H04W 24/10* (2013.01); *H04W 48/18* (2013.01); *H04W 92/12* (2013.01)

(58) Field of Classification Search
CPC ..... H04W 48/16; H04W 24/10; H04W 48/18; G06N 20/00
USPC ........................................................ 370/329
See application file for complete search history.

(56) References Cited

U.S. PATENT DOCUMENTS

| | | | |
|---|---|---|---|
| 2016/0044702 A1* | 2/2016 | Centonza ............. | H04W 24/08 370/328 |
| 2022/0116799 A1* | 4/2022 | Wang ................... | H04B 7/0452 |

OTHER PUBLICATIONS

"O-RAN.WG2.A1GAP-v02.02", O-RAN Working Group 2 (Non-RT RIC and A1 interface WG) A1 interface: General Aspects and PrinciplesTechnical Specification, (2021), 21 pgs.
"3GPP TS 36.401 v15.1.0", LTE;Evolved Universal Terrestrial Radio Access Network (E-UTRAN); Architecture description(3GPP TS 36.401 version 15.1.0 Release 15), (Apr. 2019), 23 pga.

(Continued)

*Primary Examiner* — Faisal Choudhury
(74) *Attorney, Agent, or Firm* — Schwegman Lundberg & Woessner, P.A.

(57) ABSTRACT

An apparatus for a Non-Real-Time RAN Intelligent Controller (Non-RT RIC) of a Service Management and Orchestration (SMO) entity of an Open Radio Access Network (O-RAN) includes processing circuitry coupled to memory. To configure the Non-RT RIC for allocation of network slice subnet instance (NSSI) resources in the O-RAN, the processing circuitry is to collect performance measurements related to usage of the NSSI resources. An artificial intelligence (AI)/machine learning (ML) model is trained based on the performance measurements. The allocation of the NSSI resources is optimized at a time determined by an inference of the AI/ML model.

20 Claims, 19 Drawing Sheets

(56) References Cited

OTHER PUBLICATIONS

"3GPP TS 36.420 v15.2.0", LTE;Evolved Universal TerrestrialRadio Access Network (E-UTRAN);X2 general aspects and principles(3GPP TS 36.420 version 15.2.0 Release 15), (Jan. 2020), 9 pgs.

"3GPP TS 38.300 v16.2.0", 5G;NR;NR and NG-RAN Overall description;Stage-2(3GPP TS 38.300 version 16.2.0 Release 16), (Jul. 2020), 150 pgs.

"3GPP TS 38.401 v16.0.0", 3rd Generation Partnership Project;Technical Specification Group Radio Access Network; NG-RAN;Architecture description(Release 16), (Dec. 2019), 49 pgs.

"3GPP TS 38.420 v15.2.0", 3rd Generation Partnership Project;Technical Specification Group Radio Access Network; NG-RAN;Xn general aspects and principles(Release 15), (Dec. 2018), 15 pgs.

"3GPP TS 38.460 v16.0.0", 3rd Generation Partnership Project;Technical Specification Group Radio Access Network; NG-RAN;E1 general aspects and principles(Release 16), (Dec. 2019), 10 pgs.

"3GPP TS 38.470 v16.0.0", 3rd Generation Partnership Project;Technical Specification Group Radio Access Network; NG-RAN;F1 general aspects and principles(Release 15), (Dec. 2019), 13 pgs.

"O-RAN Operations and Maintenance Interface Specification", V02.00, (2019), 47 pgs.

"O-Ran WG1 Operations and Maintenance Architecture", v02.01, (2019), 47 pgs.

"O-RAN-WG3.E2AP.0-v0.1", O-RAN Working Group 3, Near-Real-time RAN Intelligent Controller,E2 Application Protocol (E2AP), (2019), 40 pgs.

"O-RAN-WG4.CUS.0-v02.00", O-RAN Fronthaul Working GroupControl, User and Synchronization Plane Specification, (2019), 218 pgs.

"O-RAN-WG4.MP.0-v02.00.00", O-RAN Alliance Working Group 4Management Plane Specification, (2019), 149 pgs.

\* cited by examiner

RESOURCE ALLOCATION AND ACTIVATION/DEACTIVATION CONFIGURATION OF OPEN RADIO ACCESS NETWORK (O-RAN) NETWORK SLICE SUBNETS

PRIORITY CLAIM

This application claims the benefit of priority to the following applications:

U.S. Provisional Patent Application 63/020,381, filed May 5, 2020, and entitled "RESOURCE ALLOCATION FOR OPEN RADIO ACCESS NETWORK NETWORK SLICE SUBNETS"; and U.S. Provisional Patent Application 63/022,266, filed May 8, 2020, and entitled "METHOD AND APPARATUS TO SUPPORT THE ACTIVATION AND DEACTIVATION OF O-RAN NETWORK SLICE SUBNETS."

Each of the provisional patent applications listed above is incorporated herein by reference in its entirety.

TECHNICAL FIELD

Aspects pertain to wireless communications. Some aspects relate to wireless networks including 3GPP (Third Generation Partnership Project) networks. 3GPP LTE (Long Term Evolution) networks, 3GPP LTE-A (LTE Advanced) networks, (MulteFire, LTE-U), and fifth-generation (5G) networks including 5G new radio (NR) (or 5G-NR) networks, 5G-LTE networks such as 5G NR unlicensed spectrum (NR-U) networks and other unlicensed networks including Wi-Fi, CBRS (OnGo), etc. Other aspects are directed to Open RAN (O-RAN) architectures and, more specifically, techniques for resource allocation for O-RAN network slice subnets and techniques for activation and deactivation of the O-RAN network slice subnets.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modem society has continued to drive demand for a wide variety of networked devices in many disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. MulteFire combines the performance benefits of LTE technology with the simplicity of Wi-Fi-like deployments.

Further enhanced operation of LTE and NR systems in the licensed, as well as unlicensed spectrum, is expected in future releases and 5G systems such as O-RAN systems. Such enhanced operations can include techniques for resource allocation for O-RAN network slice subnet instances and techniques for activation and deactivation of the O-RAN network slice subnet instances (NSSIs).

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
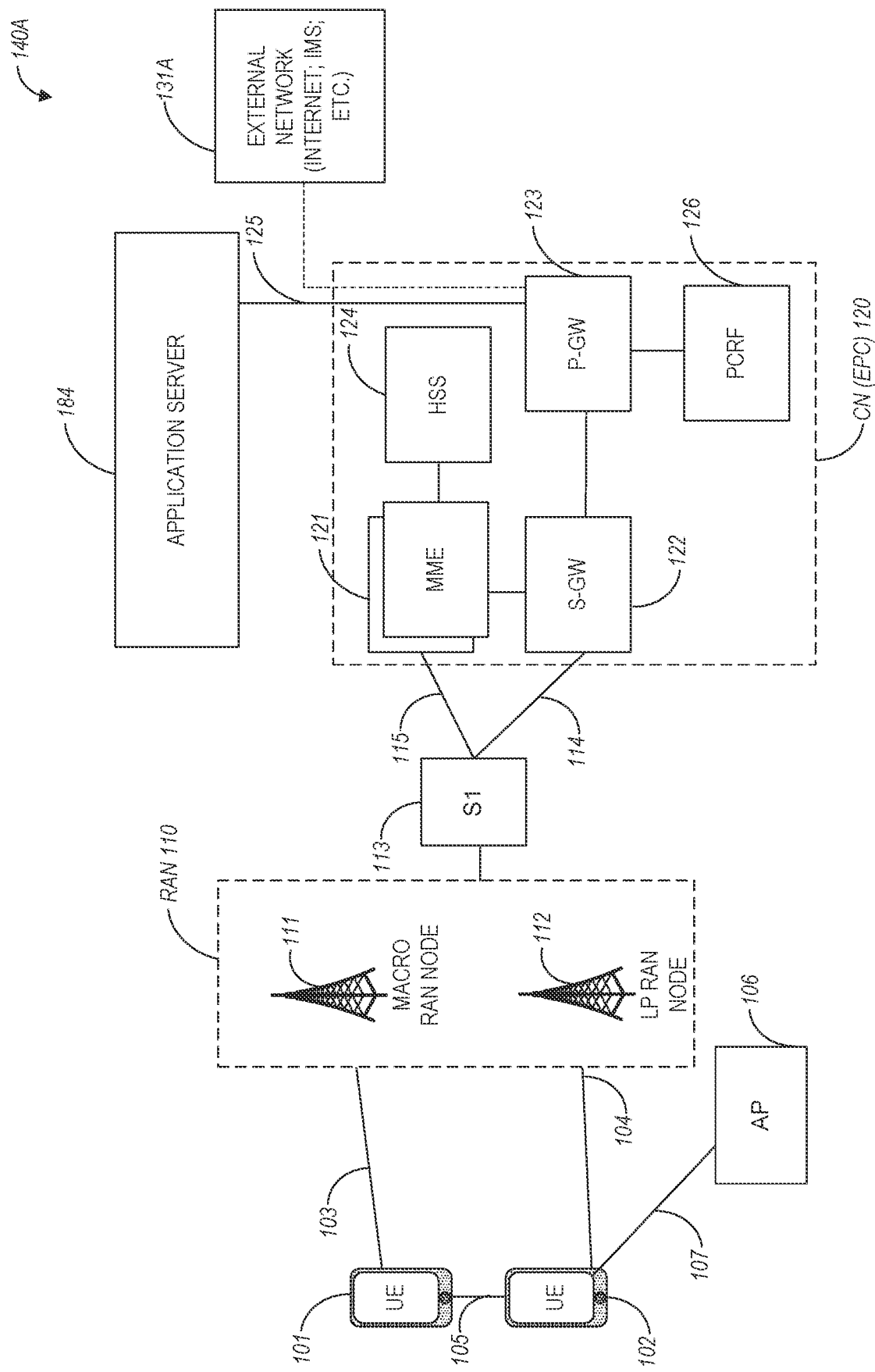
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC). OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe), or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, a Universal Mobile Telecommunications System (UMTS), an Evolved Universal Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below): in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFig) router. In this example, the AP 106 is shown to be connected to the Internet without connecting to the core network of the wireless system (described in further detail below).

The RAN 110 can include one or more access nodes that enable connections 103 and 104. These access nodes (ANs) can be referred to as base stations (BSs), NodeBs, evolved NodeBs (eNBs), Next Generation NodeBs (gNBs), RAN network nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112 or an unlicensed spectrum based secondary RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management, and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries user traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and route data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including a 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, a RAN network node, and so forth. In some aspects, a gNB can be a master node (MN) and NG-eNB can be a secondary node (SN) in a 5G architecture. In some aspects, the master/primary node may operate in a licensed band and the secondary node may operate in an unlicensed band.

Figure 1B:
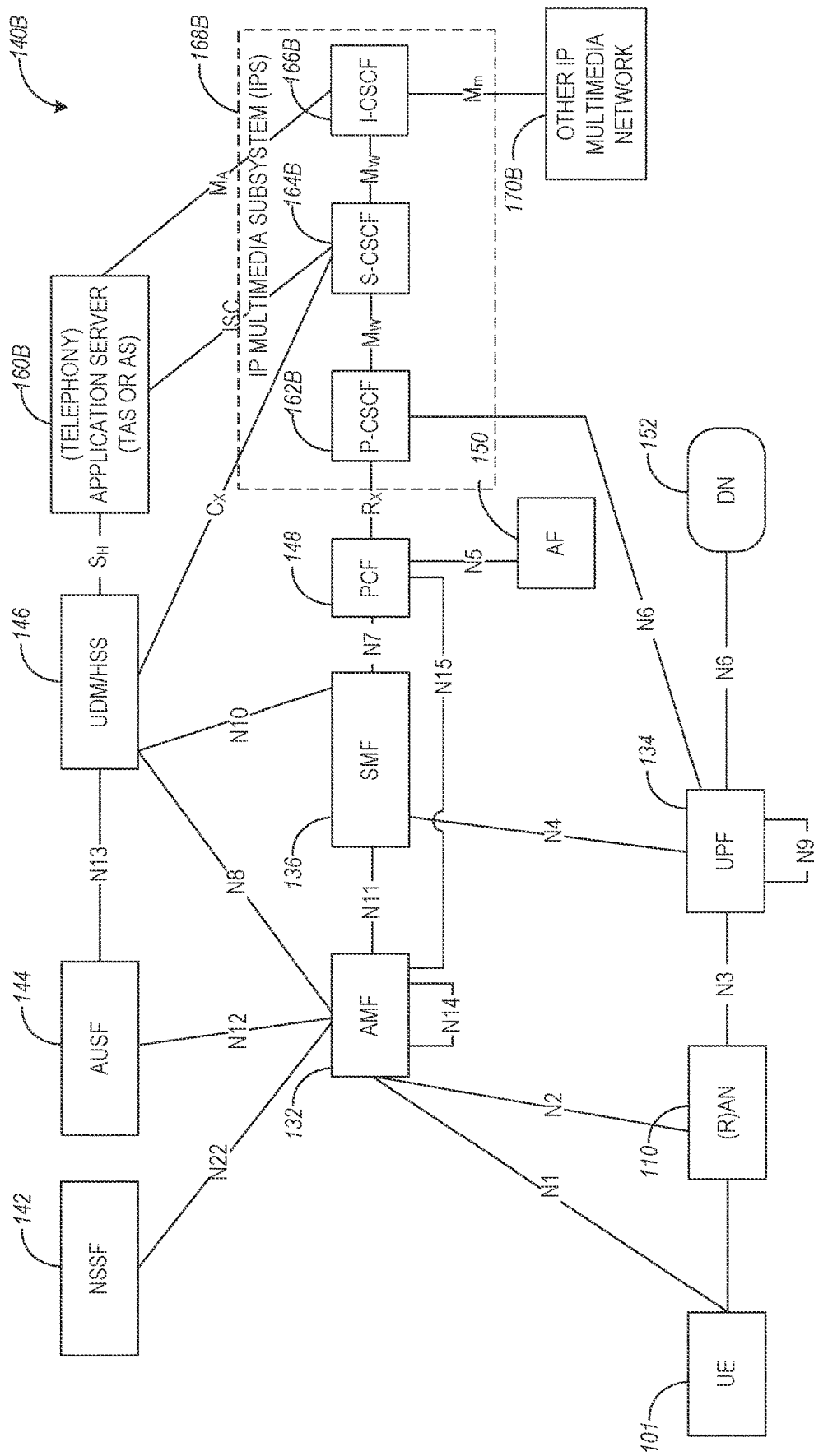
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically. UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP.

The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown). N8 (between the UDM 146 and the AMF 132, not shown), N9 (between two UPFs 134, not shown). N10 (between the UDM 146 and the SMF 136, not shown), N11 (between the AMF 132 and the SMF 136, not shown). N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
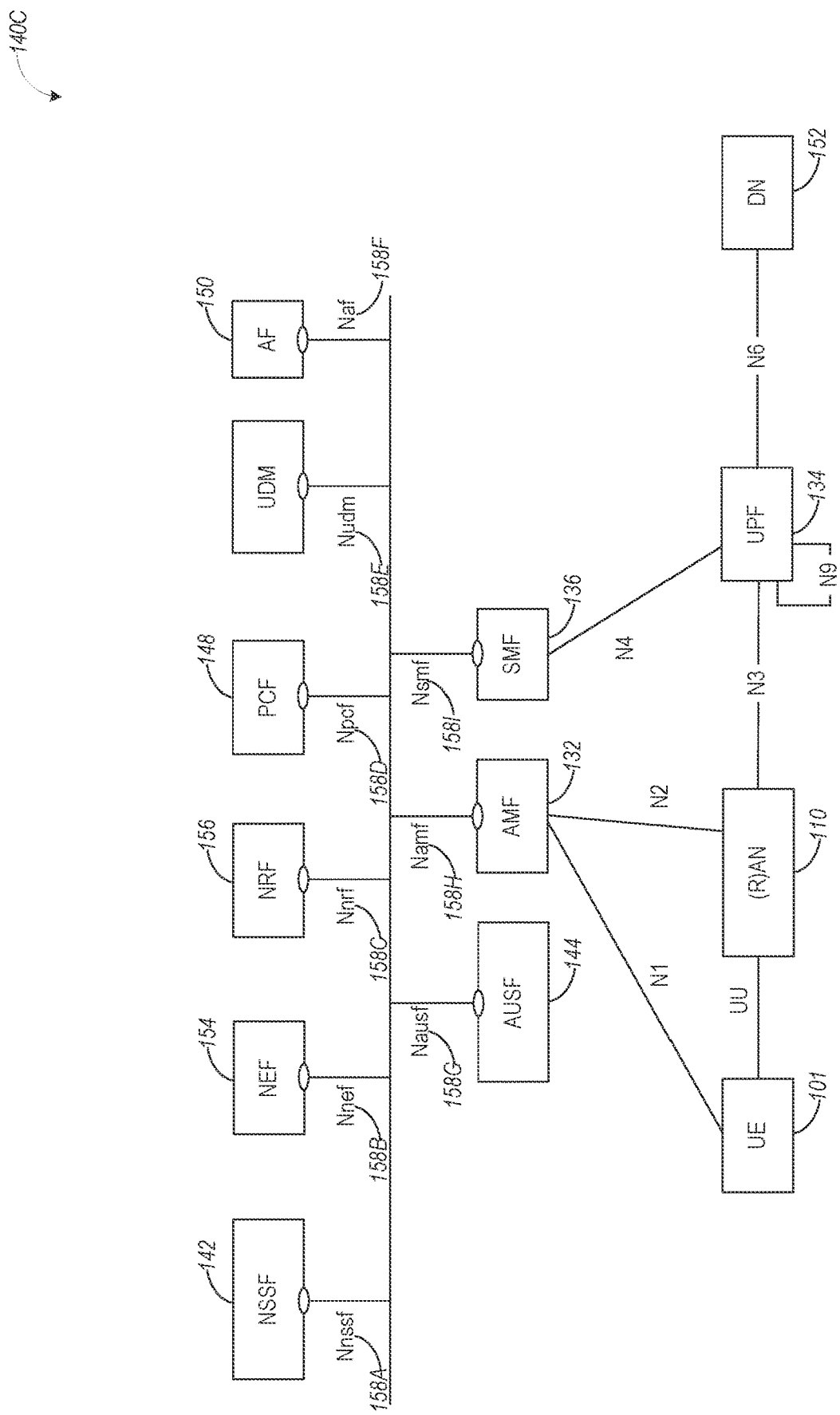

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Figure 2:
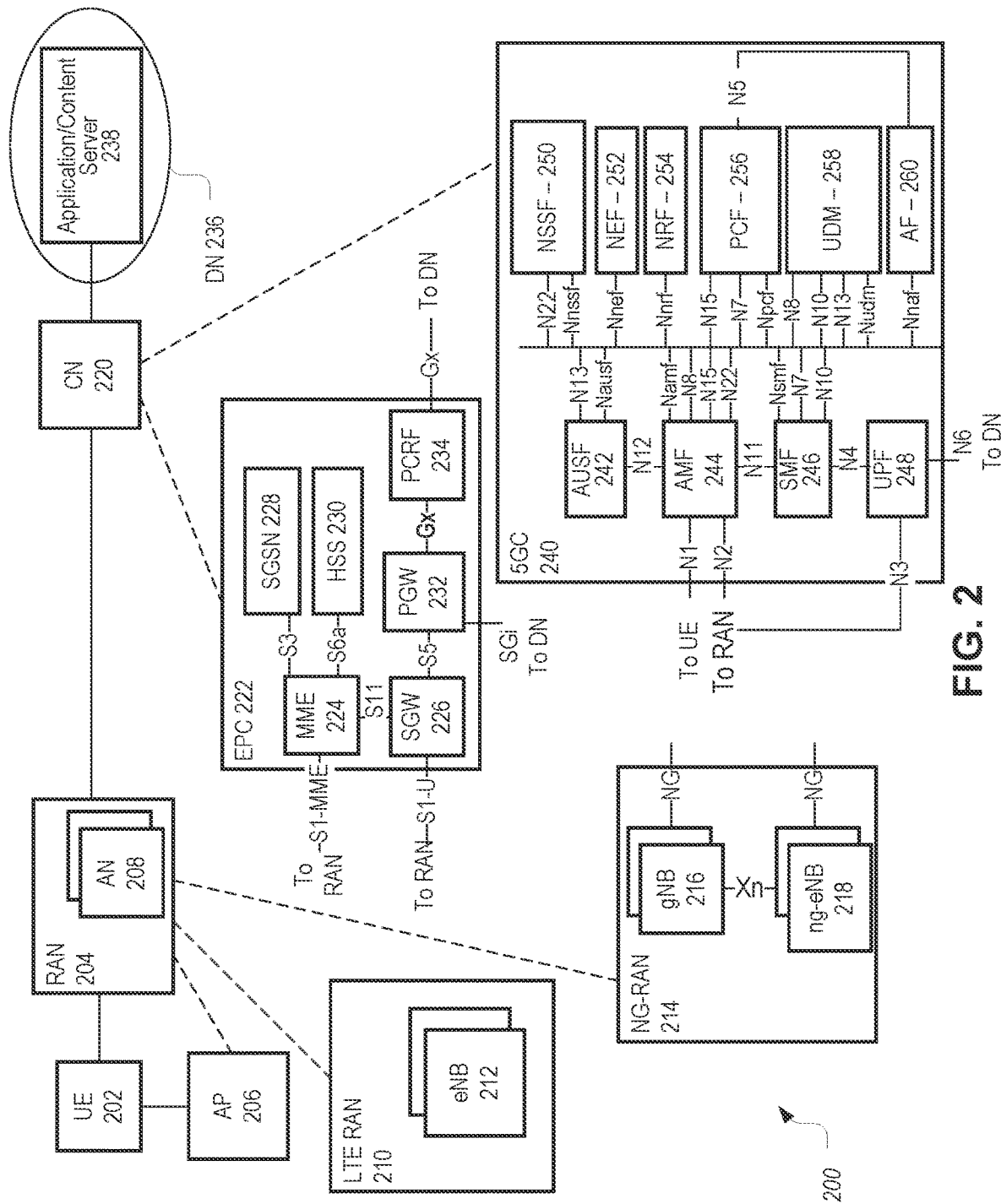
FIG. 2, FIG. 3, and FIG. 4 illustrate various systems, devices, and components that may implement aspects of disclosed embodiments.
Figure 3:
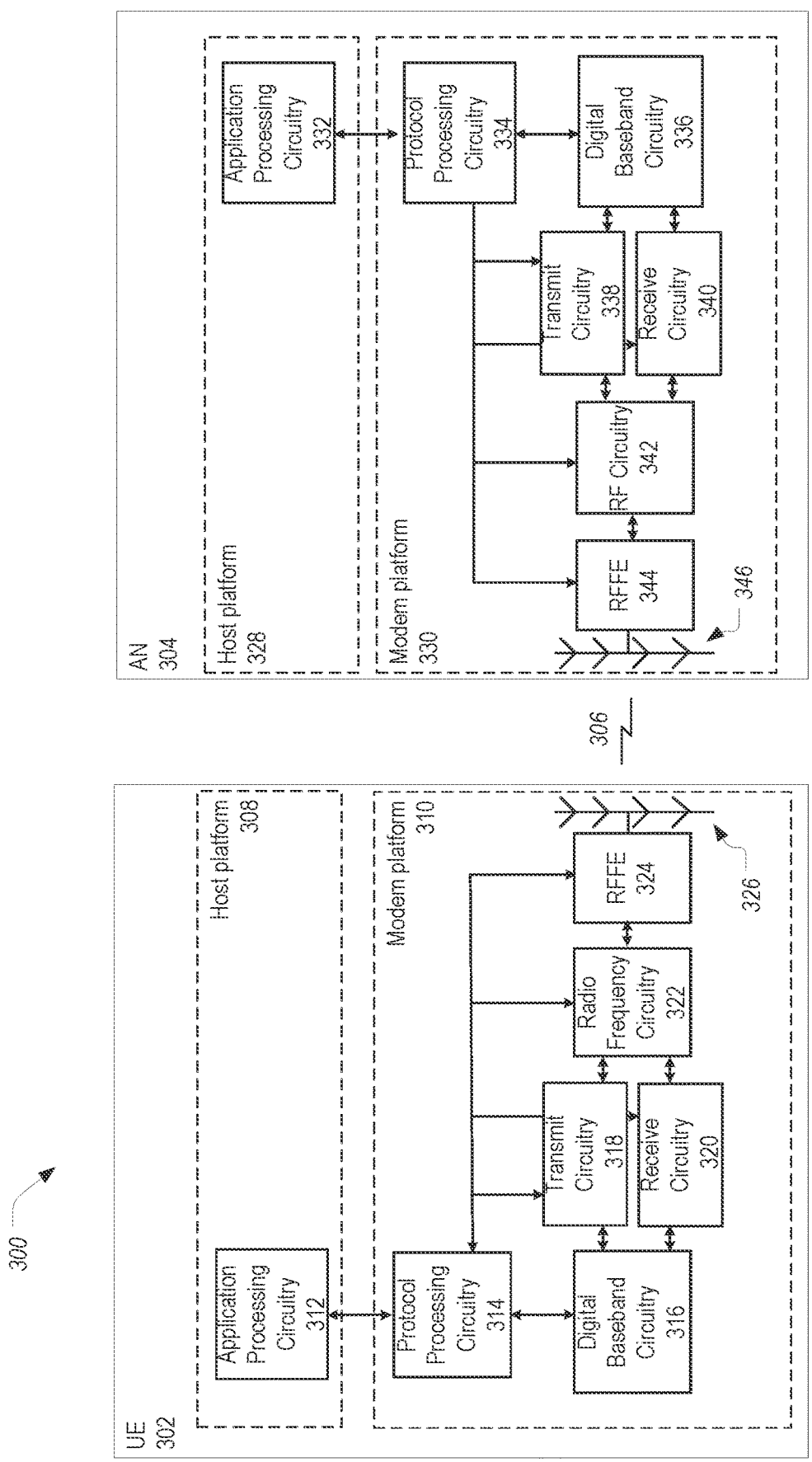
Figure 4:
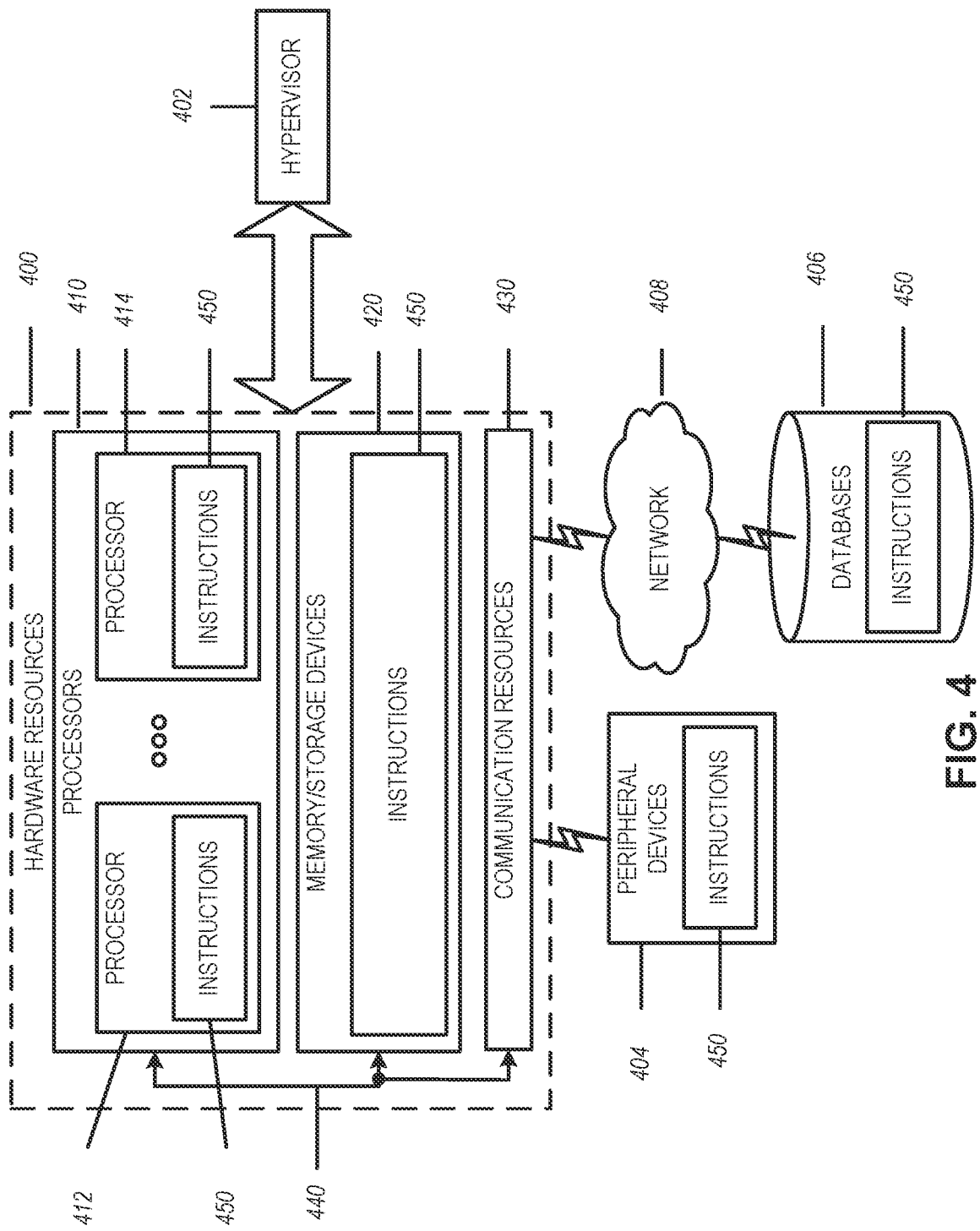

FIG. 2, FIG. 3, and FIG. 4 illustrate various systems, devices, and components that may implement aspects of disclosed embodiments.

FIG. 2 illustrates a network 200 in accordance with various embodiments. The network 200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 200 may include a UE 202, which may include any mobile or non-mobile computing device designed to communicate with a RAN 204 via an over-the-air connection. The UE 202 may be, but is not limited to, a smartphone, tablet computer, wearable computing device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 200 may include a plurality of UEs coupled directly with one another via a sidelink interface. The UEs may be M2M/D2D devices that communicate using physical sidelink channels such as but not limited to, PSBCH, PSDCH, PSSCH, PSCCH, PSFCH, etc.

In some embodiments, the UE 202 may additionally communicate with an AP 206 via an over-the-air connection. The AP 206 may manage a WLAN connection, which may serve to offload some/all network traffic from the RAN 204. The connection between the UE 202 and the AP 206 may be consistent with any IEEE 802.11 protocol, wherein the AP 206 could be a wireless fidelity (Wi-Fi®) router. In some embodiments, the UE 202, RAN 204, and AP 206 may utilize cellular-WLAN aggregation (for example, LWA/LWIP). Cellular-WLAN aggregation may involve the UE 202 being configured by the RAN 204 to utilize both cellular radio resources and WLAN resources.

The RAN 204 may include one or more access nodes, for example, access node (AN) 208. AN 208 may terminate air-interface protocols for the UE 202 by providing access stratum protocols including RRC, Packet Data Convergence Protocol (PDCP), Radio Link Control (RLC), MAC, and L1 protocols. In this manner, the AN 208 may enable data/voice connectivity between the core network (CN) 220 and the UE 202. In some embodiments, the AN 208 may be implemented in a discrete device or as one or more software entities running on server computers as part of, for example, a virtual network, which may be referred to as a CRAN or virtual baseband unit pool. The AN 208 be referred to as a BS, gNB, RAN node, eNB, ng-eNB, NodeB, RSU, TRxP, TRP, etc. The AN 208 may be a macrocell base station or a low-power base station for providing femtocells, picocells, or other like cells having smaller coverage areas, smaller user capacity, or higher bandwidth compared to macrocells.

In embodiments in which the RAN 204 includes a plurality of ANs, they may be coupled with one another via an X2 interface (if the RAN 204 is an LTE RAN) or an Xn interface (if the RAN 204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs of the RAN 204. For example, the UE 202 and RAN 204 may use carrier aggregation to allow the UE 202 to connect with a plurality of component carriers, each corresponding to a Pcell or Scell. In dual connectivity scenarios, a first AN may be a master node that provides an MCG and a second AN may be a secondary node that provides an SCG. The first/second ANs may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/Scells. Before accessing the unlicensed spectrum, the nodes may perform medium/carrier-sensing operations based on, for example, a listen-before-talk (LBT) protocol.

In V2X scenarios, the UE 202 or AN 208 may be or act as a roadside unit (RSU), which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high-speed events, such as crash avoidance, traffic warnings, and the like. Additionally, or alternatively, the RSU may provide other cellular/WLAN communications services. The components of the RSU may be packaged in a weatherproof enclosure suitable for outdoor installation and may include a network interface controller to provide a wired connection (e.g., Ethernet) to a traffic signal controller or a backhaul network.

In some embodiments, the RAN 204 may be an LTE RAN 210 with eNBs, for example, eNB 212. The LTE RAN 210 may provide an LTE air interface with the following characteristics: sub-carrier spacing (SCS) of 15 kHz; CP-OFDM waveform for downlink (DL) and SC-FDMA waveform for uplink (UL): turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operate on sub-6 GHz bands.

In some embodiments, the RAN 204 may be an NG-RAN 214 with gNBs, for example, gNB 216, or ng-eNBs, for example, ng-eNB 218. The gNB 216 may connect with 5G-enabled UEs using a 5G NR interface. The gNB 216 may connect with a 5G core through an NG interface, which may include an N2 interface or an N3 interface. The ng-eNB 218 may also connect with the 5G core through an NG interface but may connect with a UE via an LTE air interface. The gNB 216 and the ng-eNB 218 may connect over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN 214 and an AMF 244 (e.g., N2 interface).

The NG-RAN 214 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS. PDSCH/PDCCH DMRS similar to the LTE air interface. The 5G-NR air interface may not use a CRS but may use PBCH DMRS for PBCH demodulation: PTRS for phase tracking for PDSCH and tracking reference signal for time tracking. The 5G-NR air interface may operate on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs (bandwidth parts) for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amounts of frequency resources (for example, PRBs) to support data transmission under different traffic loading scenarios. A BWP containing a smaller number of PRBs can be used for data transmission with a small traffic load while allowing power saving at the UE 202 and in some cases at the gNB 216. A BWP containing a larger number of PRBs can be used for scenarios with higher traffic loads.

The RAN 204 is communicatively coupled to CN 220 that includes network elements to provide various functions to support data and telecommunications services to customers/subscribers (for example, users of UE 202). The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

In some embodiments, the CN 220 may be connected to the LTE radio network as part of Enhanced Packet System (EPS) 222, which may also be referred to as an EPC (or enhanced packet core). The EPC 222 may include MME 224, SGW 226, SGSN 228, HSS 230, PGW 232, and PCRF 234 coupled with one another over interfaces (or "reference points") as shown. Functions of the elements of the EPC 222 may be briefly introduced as follows.

The MME 224 may implement mobility management functions to track the current location of the UE 202 to facilitate paging, bearer activation/deactivation, handovers, gateway selection, authentication, etc.

The SGW 226 may terminate an S1 interface toward the RAN and route data packets between the RAN and the EPC 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 may track the location of the UE 202 and perform security functions and access control. In addition, the SGSN 228 may perform inter-EPC node signaling for mobility between different RAT networks, PDN and S-GW selection as specified by MME 224; MME selection for handovers; etc. The S3 reference point between the MME 224 and the SGSN 228 may enable user and bearer information exchange for inter-3GPP access network mobility in idle/active states.

The HSS 230 may include a database for network users, including subscription-related information to support the network entities' handling of communication sessions. The HSS 230 can provide support for routing/roaming, authentication, authorization, naming/addressing resolution, location dependencies, etc. An S6a reference point between the HSS 230 and the MME 224 may enable the transfer of subscription and authentication data for authenticating/authorizing user access to the LTE CN 220.

The PGW 232 may terminate an SGi interface toward a data network (DN) 236 that may include an application/content server 238. The PGW 232 may route data packets between the LTE CN 222 and the data network 236. The PGW 232 may be coupled with the SGW 226 by an S5 reference point to facilitate user plane tunneling and tunnel management. The PGW 232 may further include a node for policy enforcement and charging data collection (for example, PCEF). Additionally, the SGi reference point between the PGW 232 and the data network 236 may be an operator external public, a private PDN, or an intra-operator packet data network, for example, for provision of IMS services. The PGW 232 may be coupled with a PCRF 234 via a Gx reference point.

The PCRF 234 is the policy and charging control element of the LTE CN 222. The PCRF 234 may be communicatively coupled to the app/content server 238 to determine appropriate QoS and charging parameters for service flows. The PCRF 232 may provision associated rules into a PCEF (via Gx reference point) with appropriate TFT and QCI.

In some embodiments, the CN 220 may be a 5GC 240. The 5GC 240 may include an AUSF 242, AMF 244, SMF 246, UPF 248, NSSF 250, NEF 252, NRF 254, PCF 256, UDM 258, and AF 260 coupled with one another over interfaces (or "reference points") as shown. Functions of the elements of the 5GC 240 may be briefly introduced as follows.

The AUSF 242 may store data for authentication of UE 202 and handle authentication-related functionality. The AUSF 242 may facilitate a common authentication framework for various access types. In addition to communicating with other elements of the 5GC 240 over reference points as shown, the AUSF 242 may exhibit a Nausf service-based interface.

The AMF 244 may allow other functions of the 5GC 240 to communicate with the UE 202 and the RAN 204 and to subscribe to notifications about mobility events with respect to the UE 202. The AMF 244 may be responsible for registration management (for example, for registering UE 202), connection management, reachability management, mobility management, lawful interception of AMF-related events, and access authentication and authorization. The AMF 244 may provide transport for SM messages between the UE 202 and the SMF 246, and act as a transparent proxy for routing SM messages. AMF 244 may also provide transport for SMS messages between UE 202 and an SMSF. AMF 244 may interact with the AUSF 242 and the UE 202 to perform various security anchor and context management functions. Furthermore, AMF 244 may be a termination point of a RAN CP interface, which may include or be an N2 reference point between the RAN 204 and the AMF 244; and the AMF 244 may be a termination point of NAS (N1) signaling, and perform NAS ciphering and integrity protection. AMF 244 may also support NAS signaling with the UE 202 over an N3 IWF interface.

The SMF 246 may be responsible for SM (for example, session establishment, tunnel management between UPF 248 and AN 208); UE IP address allocation and management (including optional authorization); selection and control of UP function; configuring traffic steering at UPF 248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 244 over N2 to AN 208; and determining SSC mode of a session. SM may refer to the management of a PDU session, and a PDU session or "session" may refer to a PDU connectivity service that provides or enables the exchange of PDUs between the UE 202 and the data network 236.

The UPF 248 may act as an anchor point for intra-RAT and inter-RAT mobility, an external PDU session point of interconnecting to data network 236, and a branching point to support multi-homed PDU sessions. The UPF 248 may also perform packet routing and forwarding, perform packet inspection, enforce the user plane part of policy rules, lawfully intercept packets (UP collection), perform traffic usage reporting, perform QoS handling for a user plane (e.g., packet filtering, gating. UL/DL rate enforcement), perform uplink traffic verification (e.g., SDF-to-QoS flow mapping), transport level packet marking in the uplink and downlink, and perform downlink packet buffering and downlink data notification triggering. UPF 248 may include an uplink classifier to support routing traffic flows to a data network.

The NSSF 250 may select a set of network slice instances serving the UE 202. The NSSF 250 may also determine allowed NSSAI and the mapping to the subscribed S-NSSAIs if needed. The NSSF 250 may also determine the AMF set to be used to serve the UE 202, or a list of candidate AMFs based on a suitable configuration and possibly by querying the NRF 254. The selection of a set of network slice instances for the UE 202 may be triggered by the AMF 244 with which the UE 202 is registered by interacting with the NSSF 250, which may lead to a change of AMF. The NSSF 250 may interact with the AMF 244 via an N22 reference point; and may communicate with another NSSF in a visited network via an N31 reference point (not shown). Additionally, the NSSF 250 may exhibit an Nnssf service-based interface.

The NEF 252 may securely expose services and capabilities provided by 3GPP network functions for the third party, internal exposure/re-exposure, AFs (e.g., AF 260), edge computing or fog computing systems, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on the exposed capabilities of other NFs. This information may be stored at the NEF 252 as structured data, or a data storage NF using standardized interfaces. The stored information can then be re-exposed by the NEF 252 to other NFs and AFs, or used for other purposes such as analytics. Additionally, the NEF 252 may exhibit a Nnef service-based interface.

The NRF 254 may support service discovery functions, receive NF discovery requests from NF instances, and provide the information of the discovered NF instances to the NF instances. NRF 254 also maintains information on available NF instances and their supported services. As used herein, the terms "instantiate," "instantiation," and the like may refer to the creation of an instance, and an "instance" may refer to a concrete occurrence of an object, which may occur, for example, during the execution of program code. Additionally, the NRF 254 may exhibit the Nnrf service-based interface.

The PCF 256 may provide policy rules to control plane functions to enforce them, and may also support a unified policy framework to govern network behavior. The PCF 256 may also implement a front end to access subscription information relevant for policy decisions in a UDR of the UDM 258. In addition to communicating with functions over reference points as shown, the PCF 256 exhibits an Npcf service-based interface.

The UDM 258 may handle subscription-related information to support the network entities' handling of communication sessions and may store subscription data of UE 202. For example, subscription data may be communicated via an N8 reference point between the UDM 258 and the AMF 244. The UDM 258 may include two parts, an application front end, and a UDR. The UDR may store subscription data and policy data for the UDM 258 and the PCF 256, and/or structured data for exposure and application data (including PFDs for application detection, application request information for multiple UEs 202) for the NEF 252. The Nudr service-based interface may be exhibited by the UDR 221 to allow the UDM 258, PCF 256, and NEF 252 to access a particular set of the stored data, as well as to read, update (e.g., add, modify), delete, and subscribe to the notification of relevant data changes in the UDR. The UDM may include a UDM-FE, which is in charge of processing credentials, location management, subscription management, and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

The AF 260 may provide application influence on traffic routing, provide access to NEF, and interact with the policy framework for policy control.

In some embodiments, the 5GC 240 may enable edge computing by selecting operator/3rd party services to be geographically close to a point that the UE 202 is attached to the network. This may reduce latency and load on the network. To provide edge-computing implementations, the 5GC 240 may select a UPF 248 close to the UE 202 and execute traffic steering from the UPF 248 to data network 236 via the N6 interface. This may be based on the UE subscription data, UE location, and information provided by the AF 260. In this way, the AF 260 may influence UPF (re)selection and traffic routing. Based on operator deployment, when AF 260 is considered to be a trusted entity, the network operator may permit AF 260 to interact directly with relevant NFs. Additionally, the AF 260 may exhibit a Naf service-based interface.

The data network 236 may represent various network operator services, Internet access, or third-party services that may be provided by one or more servers including, for example, application/content server 238.

FIG. 3 schematically illustrates a wireless network 300 in accordance, with various embodiments. The wireless network 300 may include a UE 302 in wireless communication with AN 304. The UE 302 and AN 304 may be similar to, and substantially interchangeable with, like-named components described elsewhere herein.

The UE 302 may be communicatively coupled with the AN 304 via connection 306. The connection 306 is illustrated as an air interface to enable communicative coupling and can be consistent with cellular communications protocols such as an LTE protocol or a 5G NR protocol operating at mmWave or sub-6 GHz frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example, IP) operations The protocol processing circuitry 314 may implement one or more layer operations to facilitate transmission or reception of data over the connection 306. The layer operations implemented by the protocol processing circuitry 314 may include, for example, MAC, RLC, PDCP, RRC, and NAS operations.

The modem platform 310 may further include digital baseband circuitry 316 that may implement one or more layer operations that are "below" layer operations performed by the protocol processing circuitry 314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318, receive circuitry 320, RF circuitry 322, RFFE 324, and antenna panels 326 (referred generically as "transmit/receive components") may be specific to details of a specific implementation such as, for example, whether the communication is TDM or FDM, in mmWave or sub-6 GHz frequencies, etc. In some embodiments, the transmit/receive components may be arranged in multiple parallel transmit/receive chains, may be disposed of in the same or different chips/modules, etc.

In some embodiments, the protocol processing circuitry 314 may include one or more instances of control circuitry (not shown) to provide control functions for the transmit/receive components.

A UE reception may be established by and via the antenna panels 326, RFFE 324, RF circuitry 322, receive circuitry 320, digital baseband circuitry 316, and protocol processing circuitry 314. In some embodiments, the antenna panels 326 may receive a transmission from the AN 304 by receive-beamforming signals received by a plurality of antennas/antenna elements of the one or more antenna panels 326.

A UE transmission may be established by and via the protocol processing circuitry 314, digital baseband circuitry 316, transmit circuitry 318, RF circuitry 322, RFFE 324, and antenna panels 326. In some embodiments, the transmit components of the UE 304 may apply a spatial filter to the data to be transmitted to form a transmit beam emitted by the antenna elements of the antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and substantially interchangeable with like-named components of the UE 302. In addition to performing data transmission/reception as described above, the components of the AN 308 may perform various logical functions that include, for example, RNC functions such as radio bearer management, uplink and downlink dynamic radio resource management, and data packet scheduling.

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440 or other interface circuitry. For embodiments where node virtualization (e.g., NFV) is utilized, a hypervisor 402 may be executed to provide an execution environment for one or more network slices/sub-slices to utilize the hardware resources 400.

The processors 410 may include, for example, a processor 412 and a processor 414. The processors 410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 420 may include a main memory, disk storage, or any suitable combination thereof. The memory/storage devices 420 may include but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 430 may include interconnection or network interface controllers, components, or other suitable devices to communicate with one or more peripheral devices 404 or one or more databases 406 or other network elements via a network 408. For example, the communication resources 430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

For one or more embodiments, at least one of the components outlined in one or more of the preceding figures may be configured to perform one or more operations, techniques, processes, and/or methods as outlined in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The term "application" may refer to a complete and deployable package, environment to achieve a certain function in an operational environment. The term "AI/ML application" or the like may be an application that contains some artificial intelligence (AI)/machine learning (ML) models and application-level descriptions.

The term "machine learning" or "ML" refers to the use of computer systems implementing algorithms and/or statistical models to perform a specific task(s) without using explicit instructions but instead relying on patterns and inferences. ML algorithms build or estimate mathematical model(s) (referred to as "ML models" or the like) based on sample data (referred to as "training data," "model training information," or the like) to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML-assisted solution using the output of the ML model inference). The term "ML training host" refers to an entity, such as a network function, that hosts the training of the model. The term "ML inference host" refers to an entity, such as a network function, that hosts the model during inference mode (which includes both the model execution as well as any online learning if applicable). The ML-host informs the actor about the output of the ML algorithm, and the actor decides for an action (an "action" is performed by an actor as a result of the output of an ML-assisted solution). The term "model inference information" refers to information used as an input to the ML model for determining inference(s); the data used to train an ML model and the data used to determine inferences may overlap, however, "training data" and "inference data" refer to different concepts.

Figure 5:
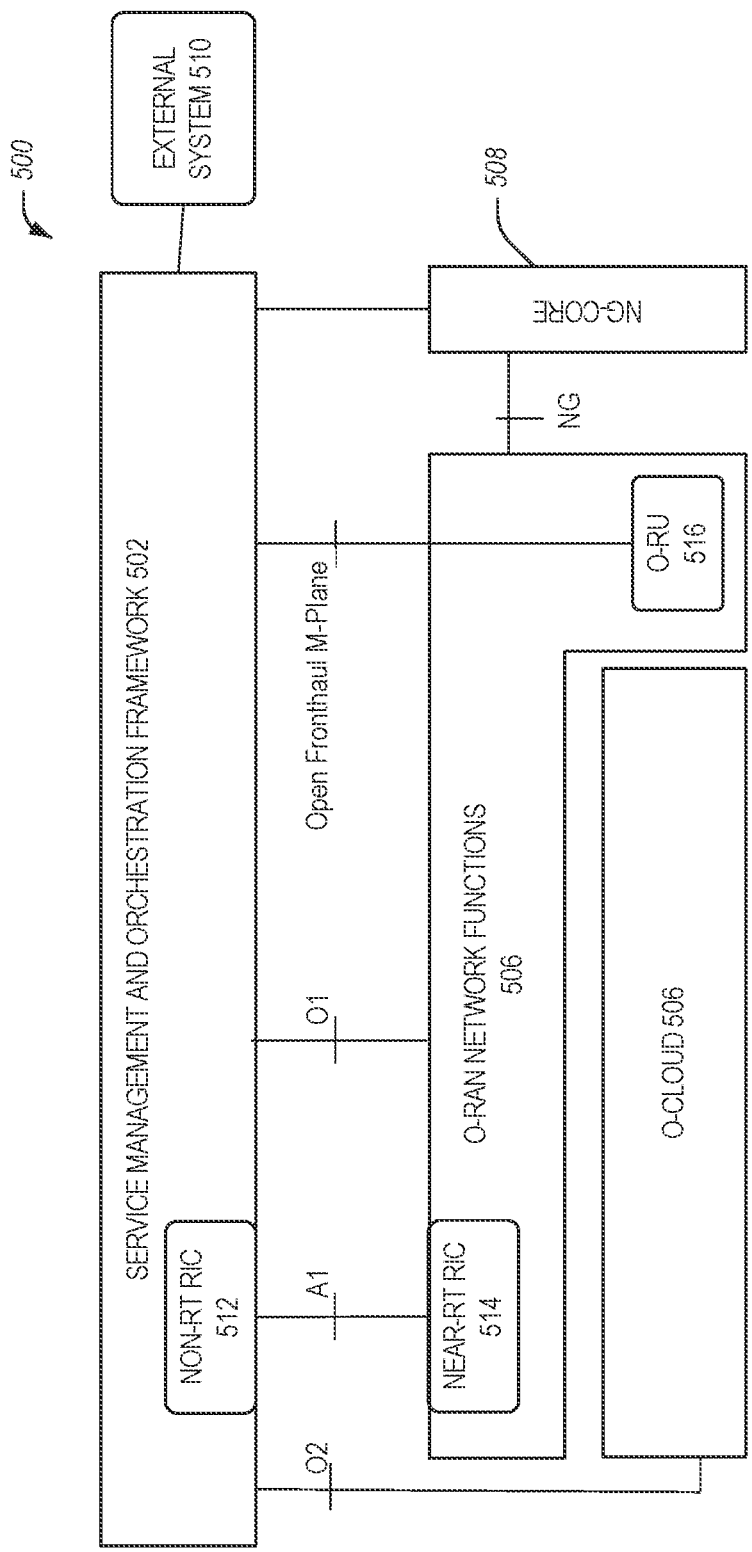
FIG. 5 illustrates an example of an Open RAN (O-RAN) system architecture, in accordance with some aspects.

FIG. 5 provides a high-level view of an Open RAN (O-RAN) architecture 500. The O-RAN architecture 500 includes four O-RAN defined interfaces—namely, the A1 interface, the O1 interface, the O2 interface, and the Open Fronthaul Management (M)-plane interface—which connect the Service Management and Orchestration (SMO) framework 502 to O-RAN network functions (NFs) 504 and the O-Cloud 506. The SMO 502 (described in [O13]) also connects with an external system 510, which provides additional configuration data to the SMO 502. FIG. 5 also illustrates that the A1 interface connects the O-RAN Non-Real Time (RT) RAN Intelligent Controller (RIC) 512 in or at the SMO 502 and the O-RAN Near-RT RIC 514 in or at the O-RAN NFs 504. The O-RAN NFs 504 can be virtualized network functions (VNFs) such as virtual machines (VMs) or containers, sitting above the O-Cloud 506 and/or Physical Network Functions (PNFs) utilizing customized hardware. All O-RAN NFs 504 are expected to support the O1 interface when interfacing with the SMO framework 502. The O-RAN NFs 504 connect to the NG-Core 508 via the NG interface (which is a 3GPP-defined interface). The Open Fronthaul M-plane interface between the O-RAN Distributed Unit (DU) and the O-RAN Radio Unit (O-RU) 516 supports the O-RU 516 management in the O-RAN hybrid model as specified in [O16]. The O-RU's termination of Open Fronthaul M-plane interface is an optional interface to the SMO 502 that is included for backward compatibility purposes as per [O16] and is intended for management of the O-RU 516 in hybrid mode only. The management architecture of flat mode [O12] and its relation to the O1 interface for the O-RU 516 is for future study. The O-RU 516 termination of the O1 interface towards the SMO 502 as specified in [O12].

Figure 6:
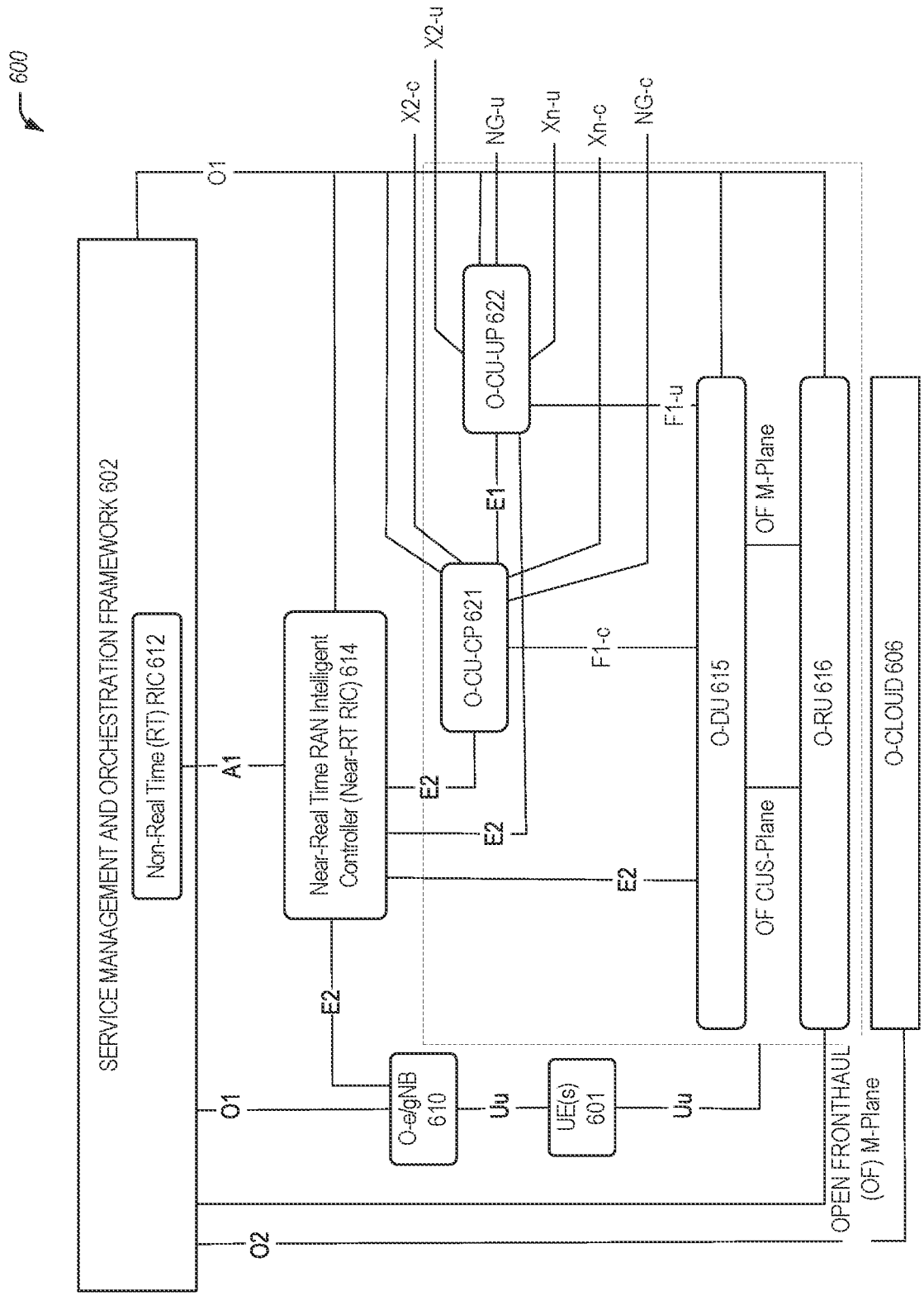
FIG. 6 illustrates a logical architecture of the O-RAN system of FIG. 5, in accordance with some aspects.

FIG. 6 shows an O-RAN logical architecture 600 corresponding to the O-RAN architecture 500 of FIG. 5. In FIG. 6, the SMO 602 corresponds to the SMO 502, O-Cloud 606 corresponds to the O-Cloud 506, the non-RT RIC 612 corresponds to the non-RT RIC 512, the near-RT RIC 614 corresponds to the near-RT RIC 514, and the O-RU 616 corresponds to the O-RU 516 of FIG. 6, respectively. The O-RAN logical architecture 600 includes a radio portion and a management portion.

The management portion/side of the architectures 600 includes the SMO Framework 602 containing the non-RT RIC 612 and may include the O-Cloud 606. The O-Cloud 606 is a cloud computing platform including a collection of physical infrastructure nodes to host the relevant O-RAN functions (e.g., the near-RT RIC 614, O-RAN Central Unit-Control Plane (O-CU-CP) 621, O-RAN Central Unit-User Plane (O-CU-UP) 622, and the O-RAN Distributed Unit (O-DU) 615), supporting software components (e.g., OSs, VMs, container runtime engines, ML engines, etc.), and appropriate management and orchestration functions.

The radio portion/side of the logical architecture 60 includes the near-RT RIC 614, the O-RAN Distributed Unit (O-DU) 615, the O-RU 616, the O-RAN Central Unit-Control Plane (O-CU-CP) 621, and the O-RAN Central Unit-User Plane (O-CU-UP) 622 functions. The radio portion/side of the logical architecture 600 may also include the O-e/gNB 610.

The O-DU 615 is a logical node hosting RLC, MAC, and higher PHY layer entities/elements (High-PHY layers) based on a lower layer functional split. The O-RU 616 is a logical node hosting lower PHY layer entities/elements (Low-PHY layer) (e.g., FFT/iFFT, PRACH extraction, etc.) and RF processing elements based on a lower layer functional split. Virtualization of O-RU 616 is FFS. The O-CU-CP 621 is a logical node hosting the RRC and the control plane (CP) part of the PDCP protocol. The O O-CU-UP 622 is a logical node hosting the user-plane part of the PDCP protocol and the SDAP protocol.

An E2 interface terminates at a plurality of E2 nodes. The E2 nodes are logical nodes/entities that terminate the E2 interface. For NR/5G access, the E2 nodes include the O-CU-CP 621, O-CU-UP 622, O-DU 615, or any combination of elements as defined in [O15]. For E-UTRA access the E2 nodes include the O-e/gNB 610. As shown in FIG. 6, the E2 interface also connects the O-e/gNB 610 to the Near-RT RIC 614. The protocols over the E2 interface are based exclusively on Control Plane (CP) protocols. The E2 functions are grouped into the following categories. (a) near-RT RIC 614 services (REPORT, INSERT, CONTROL, and POLICY, as described in [O15]); and (b) near-RT RIC 614 support functions, which include E2 Interface Management (E2 Setup, E2 Reset, Reporting of General Error Situations, etc.) and Near-RT RIC Service Update (e.g., capability exchange related to the list of E2 Node functions exposed over E2).

FIG. 6 shows the Uu interface between a UE 601 and O-e/gNB 610 as well as between the UE 601 and O-RAN components. The Uu interface is a 3GPP defined interface (see e.g., sections 5.2 and 5.3 of [O07]), which includes a complete protocol stack from L1 to L3 and terminates in the NG-RAN or E-UTRAN. The O-e/gNB 610 is an LTE eNB [O04], a 5G gNB, or ng-eNB [O06] that supports the E2 interface. The O-e/gNB 610 may be the same or similar as other RAN nodes discussed previously. The UE 601 may correspond to UEs discussed previously and/or the like. There may be multiple UEs 601 and/or multiple O-e/gNB 610, each of which may be connected to one another via respective Uu interfaces. Although not shown in FIG. 6, the O-e/gNB 610 supports O-DU 615 and O-RU 616 functions with an Open Fronthaul interface between them.

The Open Fronthaul (OF) interface(s) is/are between O-DU 615 and O-RU 616 functions [O16] [O17]. The OF interface(s) includes the Control User Synchronization (CUS) Plane and Management (M) Plane. FIG. 5 and FIG. 6 also show that the O-RU 616 terminates the OF M-Plane interface towards the O-DU 615 and optionally towards the SMO 602 as specified in [O16]. The O-RU 616 terminates the OF CUS-Plane interface towards the O-DU 615 and the SMO 602.

The F1-c interface connects the O-CU-CP 621 with the O-DU 615. As defined by 3GPP, the F1-c interface is between the gNB-CU-CP and gNB-DU nodes [O07] [O10]. However, for purposes of O-RAN, the F1-c interface is adopted between the O-CU-CP 621 with the O-DU 615 functions while reusing the principles and protocol stack defined by 3GPP and the definition of interoperability profile specifications.

The F1-u interface connects the O-CU-UP 622 with the O-DU 615. As defined by 3GPP, the F-u interface is between the gNB-CU-UP and gNB-DU nodes [O07] [O10]. However, for purposes of O-RAN, the F1-u interface is adopted between the O-CU-UP 622 with the O-DU 615 functions while reusing the principles and protocol stack defined by 3GPP and the definition of interoperability profile specifications.

The NG-c interface is defined by 3GPP as an interface between the gNB-CU-CP and the AMF in the 5GC [O06]. The NG-c is also referred to as the N2 interface (see [O06]). The NG-u interface is defined by 3GPP, as an interface between the gNB-CU-UP and the UPF in the 5GC [O06]. The NG-u interface is referred to as the N3 interface (see [O06]). In O-RAN, NG-c and NG-u protocol stacks defined by 3GPP are reused and may be adapted for 0-RAN purposes.

The X2-c interface is defined in 3GPP for transmitting control plane information between eNBs or between eNB and en-gNB in EN-DC. The X2-u interface is defined in 3GPP for transmitting user plane information between eNBs or between eNB and en-gNB in EN-DC (see e.g., [O05], [O06]). In O-RAN, X2-c and X2-u protocol stacks defined by 3GPP are reused and may be adapted for O-RAN purposes The Xn-c interface is defined in 3GPP for transmitting control plane information between gNBs, ng-eNBs, or between an ng-eNB and gNB. The Xn-u interface is defined in 3GPP for transmitting user plane information between gNBs, ng-eNBs, or between ng-eNB and gNB (see e.g., [O06], [O08]). In O-RAN, Xn-c and Xn-u protocol stacks defined by 3GPP are reused and may be adapted for O-RAN purposes.

The E1 interface is defined by 3GPP as being an interface between the gNB-CU-CP (e.g., gNB-CU-CP 3728) and gNB-CU-UP (see e.g., [O07], [O09]). In O-RAN, E1 protocol stacks defined by 3GPP are reused and adapted as being an interface between the O-CU-CP 621 and the O-CU-UP 622 functions.

The O-RAN Non-Real Time (RT) RAN Intelligent Controller (RIC) 612 is a logical function within the SMO framework 502, 602 that enables non-real-time control and optimization of RAN elements and resources; AI/machine learning (ML) workflow(s) including model training, inferences, and updates; and policy-based guidance of applications/features in the Near-RT RIC 614.

In some embodiments, the non-RT RIC 612 is a function that sits within the SMO platform (or SMO framework) 602 in the O-RAN architecture. The primary goal of non-RT RIC is to support intelligent radio resource management for a non-real-time interval (i.e., greater than 500 ms), policy optimization in RAN, and insertion of AI/ML models to near-RT RIC and other RAN functions. The non-RT RIC terminates the A1 interface to the near-RT RIC. It will also collect OAM data over the O1 interface from the O-RAN nodes.

The O-RAN near-RT RIC 614 is a logical function that enables near-real-time control and optimization of RAN elements and resources via fine-grained data collection and actions over the E2 interface. The near-RT RIC 614 may include one or more AI/ML workflows including model training, inferences, and updates.

The non-RT RIC 612 can be an ML training host to host the training of one or more ML models. ML training can be performed offline using data collected from the RIC, O-DU 615, and O-RU 616. For supervised learning, non-RT RIC 612 is part of the SMO 602, and the ML training host and/or ML model host/actor can be part of the non-RT RIC 612 and/or the near-RT RIC 614. For unsupervised learning, the ML training host and ML model host/actor can be part of the non-RT RIC 612 and/or the near-RT RIC 614. For reinforcement learning, the ML training host and ML model host/actor may be co-located as part of the non-RT RIC 612 and/or the near-RT RIC 614. In some implementations, the non-RT RIC 612 may request or trigger ML model training in the training hosts regardless of where the model is deployed and executed. ML models may be trained and not currently deployed.

In some implementations, the non-RT RIC 612 provides a query-able catalog for an ML designer/developer to publish/install trained ML models (e.g., executable software components). In these implementations, the non-RT RIC 612 may provide a discovery mechanism if a particular ML model can be executed in a target ML inference host (MF), and what number and type of ML models can be executed in the MF. For example, there may be three types of ML catalogs made discoverable by the non-RT RIC 612: a design-time catalog (e.g., residing outside the non-RT RIC 612 and hosted by some other ML platform(s)), a training/deployment-time catalog (e.g., residing inside the non-RT RIC 612), and a run-time catalog (e.g., residing inside the non-RT RIC 612). The non-RT RIC 612 supports necessary capabilities for ML model inference in support of ML-assisted solutions running in the non-RT RIC 612 or some other ML inference host. These capabilities enable executable software to be installed such as VMs, containers, etc. The non-RT RIC 612 may also include and/or operate one or more ML engines, which are packaged software executable libraries that provide methods, routines, data types, etc., used to run ML models. The non-RT RIC 612 may also implement policies to switch and activate ML model instances under different operating conditions.

The non-RT RIC 612 can access feedback data (e.g., FM and PM statistics) over the O1 interface on ML model performance and perform necessary evaluations. If the ML model fails during runtime, an alarm can be generated as feedback to the non-RT RIC 612. How well the ML model is performing in terms of prediction accuracy or other operating statistics it produces can also be sent to the non-RT RIC 612 over O1. The non-RT RIC 612 can also scale ML model instances running in a target MF over the O1 interface by observing resource utilization in MF. The environment where the ML model instance is running (e.g., the MF) monitors resource utilization of the running ML model. This can be done, for example, using an ORAN-SC component called ResourceMonitor in the near-RT RIC 614 and/or in the non-RT RIC 612, which continuously monitors resource utilization. If resources are low or fall below a certain threshold, the runtime environment in the near-RT RIC 614 and/or the non-RT RIC 612 provides a scaling mechanism to add more ML instances. The scaling mechanism may include a scaling factor such as a number, percentage, and/or other like data used to scale up/down the number of ML instances. ML model instances running in the target ML inference hosts may be automatically scaled by observing resource utilization in the MF. For example, the Kubemetes® (K8s) runtime environment typically provides an auto-scaling feature.

The A1 interface is between the non-RT RIC 612 (within or outside the SMO 602) and the near-RT RIC 614. The A1 interface supports three types of services as defined in [O14], including a Policy Management Service, an Enrichment Information Service, and ML Model Management Service. A1 policies have the following characteristics compared to persistent configuration [O14]: A1 policies are not critical to traffic; A1 policies have temporary validity: A1 policies may handle individual UE or dynamically defined groups of UEs; A1 policies act within and take precedence over the configuration; and A1 policies are non-persistent, i.e., do not survive a restart of the near-RT RIC.

The following References are used in the preceding paragraphs: [O04] 3GPP TS 36.401 v15.1.0 (2019 Jan. 9); [O05] 3GPP TS 36.420 v15.2.0 (2020 Jan. 9); [O06] 3GPP TS 38.300 v16.0.0 (2020 Jan. 8); [O07] 3GPP TS 38.401 v16.0.0 (2020 Jan. 9); [O08] 3GPP TS 38.420 v15.2.0 (2019 Jan. 8); [O09] 3GPP TS 38.460 v16.0.0 (2020 Jan. 9); [O10] 3GPP TS 38.470 v16.0.0 (2020 Jan. 9): [O12] O-RAN Alliance Working Group 1, O-RAN Operations and Maintenance Architecture Specification, version 2.0 (December 2019) ("O-RAN-WG1.OAM-Architecture-v02.00"); [O13] O-RAN Alliance Working Group 1, O-RAN Operations and Maintenance Interface Specification, version 2.0 (December 2019) ("O-RAN-WG1.O1-Interface-v02.00"): [O14] O-RAN Alliance Working Group 2, 0-RAN A1 interface: General Aspects and Principles Specification, version 1.0 (October 2019) ("ORAN-WG2.A1.GA&P-v01.00"): [O15] O-RAN Alliance Working Group 3, Near-Real-time RAN Intelligent Controller Architecture & E2 General Aspects and Principles ("ORAN-WG3.E2GAP.0-v0.1"); [O16] O-RAN Alliance Working Group 4, 0-RAN Fronthaul Management Plane Specification, version 2.0 (July 2019) ("ORAN-WG4.MP.0-v02.00.00"); and [O17] O-RAN Alliance Working Group 4, 0-RAN Fronthaul Control. User and Synchronization Plane Specification, version 2.0 (July 2019) ("ORAN-WG4.CUS.0-v02.00").

In some embodiments, an O-RAN network node can include a disaggregated node with at least one O-RAN Radio Unit (O-RU), at least one O-DU coupled via an F1 interface to at least one O-CU coupled via an E2 interface to a RIC (e.g., RIC 612 and/or RIC 614).

As illustrated in FIG. 5 and FIG. 6, key interfaces in O-RAN (e.g., defined and maintained by O-RAN) include the following interfaces: A1, O1, O2, E2, Open Fronthaul M-Plane, and O-Cloud. O-RAN network functions (NFs) can be VNFs. VMs, Containers, and PNFs. Interfaces defined and maintained by 3GPP which are part of the O-RAN architecture include the following interfaces: E1, F1, NG-C, NG-U, X2, Xn, and Uu interfaces.

As illustrated in FIG. 5 and FIG. 6, the following O-RAN control loops may be configured:
 (a) Loop-1: (O-DU Scheduler control loop) TTI msec level scheduling;
 (b) Loop-2: (Near-RT RIC) 10-500 msec resource optimization; and
 (c) Loop-3: (Non-RT RIC) Greater than 500 msec, Policies, Orchestration, and SON.

As illustrated in FIG. 5 and FIG. 6, the following O-RAN nodes may be configured:
 (a) O-CU-CP: RRC and PDCP-C NFs (associated with Loop-2);
 (b) O-CU-UP: SDAP and PDCP-U NFs (associated with Loop-2);
 (c) O-DU: RLC, MAC, and PHY-U NFs (associated with Loop-1); and
 (d) O-RU: PHY-L and RF (associated with Loop 1).

As illustrated in FIG. 5 and FIG. 6, the following O-RAN RIC components may be configured:
 (a) Non-RT-RIC: Loop 3 RRM services (O1 and A1 interfaces); and
 (b) Near-RT-RIC: Loop 2 RRM services (E2 interface).

As illustrated in FIG. 5 and FIG. 6, the following O-RAN interfaces may be configured:
 (a) A1 interface is between Non-RT-RIC and the Near-RT RIC functions; A1 is associated with policy guidance for control-plane and user-plane functions; Impacted O-RAN elements associated with A1 include O-RAN nodes. UE groups, and UEs;
 (b) O1 interface is between O-RAN Managed Element and the management entity; O1 is associated with Management-plane functions, Configuration, and threshold settings mostly OAM & FCAPS functionality to O-RAN network functions; Impacted O-RAN elements associated with O1 include mostly O-RAN nodes and UE groups (identified e.g. by S-NSSAI and slice ID), sometimes individual UEs (pending solution for UE identifiers);
 (c) O2 interface is between the SMO and Infrastructure Management Framework: O2 is associated with Management of Cloud infrastructure and Cloud resources allocated to O-RAN, FCAPS for O-Cloud; Impacted O-RAN elements associated with O2 include O-Cloud, UE groups, and UEs;
 (d) E2 interface is between Near-RT RIC and E2 node; E2 is associated with control-plane and user-plane control functions: Impacted O-RAN elements associated with E2 include mostly individual UEs, sometimes UE groups and E2 nodes;
 (e) E2-cp is between Near-RT RIC and O-CU-CP functions. E2-up is between Near-RT RIC and O-CU-UP functions;
 (f) E2-du is between Near-RT RIC and O-DU functions. E2-en is between Near-RT RIC and O-eNB functions; and
 (g) Open Fronthaul Interface is between O-DU and O-RU functions; this interface is associated with CUS (Control User Synchronization) Plane and Management Plane functions and FCAPS to O-RU; Impacted O-RAN elements associated with the Open Fronthaul Interface include O-DU and O-RU functions.

As illustrated in FIGS. 1-6, the following 3GPP interfaces may be configured:
 (a) E1 interface between the gNB-CU-CP and gNB-CU-UP logical nodes. In O-RAN, it is adopted between the O-CU-CP and the O-CU-UP.

(b) F1 interface between the gNB-CU and gNB-DU logical nodes. In O-RAN, it is adopted between the O-CU and the O-DU. F1-c is between O-CU-CP and O-DU functions. F1-u is between O-CU-UP and O-DU functions.

(c) The NG-U interface, is between the gNB-CU-UP and the UPF in the 5GC and is also referred to as N3. In O-RAN, it is adopted between the O-CU-UP and the 5GC.

(d) The X2 interface connects eNBs or connects eNB and en-gNB in EN-DC. In O-RAN, it is adopted for the definition of interoperability profile specifications. X2-c is for the control plane. X2-u for a user plane.

(e) The Xn interface connects gNBs, ng-eNBs, or connects ng-eNB and gNB. In O-RAN, it is adopted for the definition of interoperability profile specifications. Xn-c is for the control plane. Xn-u is for the user plane.

(f) The UE to e/gNB interface is the Uu interface and is a complete protocol stack from L1 to L3 and terminates in the NG-RAN. Since the Uu messages still flow from the UE to the intended e/gNB managed function, it is not shown in the O-RAN architecture as a separate interface to a specific managed function.

In example embodiments, any of the UEs or RAN network nodes discussed in connection with FIG. 1A-FIG. 6 can be configured to operate using the techniques discussed herein associated with multi-access traffic management in an O-RAN architecture.

The Open RAN (O-RAN) Alliance provides non-real-time (RT) and near-real-time Radio Intelligent Controller (RIC) use cases, requirements, and mechanisms to satisfy these including those for the A1 interface and E2 interface. The disclosed techniques (e.g., as illustrated in FIGS. 7-17) extend use cases and provide additional aspects of using communication with the Near-RT RIC and the Non-RT RIC in O-RAN architectures for resource allocation optimization as well as activation and deactivation of NSSIs.

A key objective of 5G is to leverage features, such as enhanced Mobile Broadband (eMBB), Ultra-Reliable Low Latency Communications (URLLC), and massive Machine Type Communications (mMTC), to enable operators or verticals to provide various services with diverse and stringent requirements. For examples, autonomous driving with ultra-low latency and ultra-high reliability requirements, AR/VR or 4K video delivery with high bandwidth and high data volume requirements, and IoT services with infrequent transmitting low data volume from smart devices. It is a challenging task for 5G networks to allocate resources dynamically and efficiently among multiple network nodes to ensure consistent quality of services and user experiences. The end-to-end network slice instances, containing RAN and core network (CN), to support distinct services respectively, are ways to mitigate the resource allocation issues.

The disclosed techniques may be used to optimize NSSI resources based on the AI/ML training and inference.

Example Use Case: NSSI Resource Allocation Optimization

This use case provides the background, motivation, description, and requirements for the NSSI resource allocation optimization use case, allowing operators to optimize the allocation of resources to NSSI(s) with a wide range of service requirements.

5G networks are becoming increasingly complex with the densification of millimeter-wave small cells, and various new services, such as eMBB, URLLC, and mMTC that are characterized by high-speed high data volume, low-speed ultra-low latency, and infrequent transmitting low data volume from smart devices, respectively. It is a challenging task for 5G networks to allocate resources dynamically and efficiently among multiple network nodes to support the various services. However, as eMBB, URLLC, and mMTC services in 5G are typically realized as network slice instances (NSIs), the resources allocated to network slice subnet instances (NSSIs) to support the O-RAN nodes can be optimized according to the service requirements.

As the new 5G services have different characteristics, the network traffic tends to be sporadic, where there may be different usage patterns in terms of time, location, UE distribution, and types of applications. For example, most IoT sensor applications may run during off-peak hours or weekends. Special events, such as sports games, concerts, can cause traffic demand to shoot up at certain times and locations. Therefore, the NSSI resource allocation optimization function trains the AI/ML model, based on historic performance data collected over time from O-RAN nodes. It then uses the AI/ML model to predict the traffic demand patterns of 5G networks in different times and locations for each network slice and automatically re-allocates the network resources ahead of the network issues surfaced.

Figure 7:
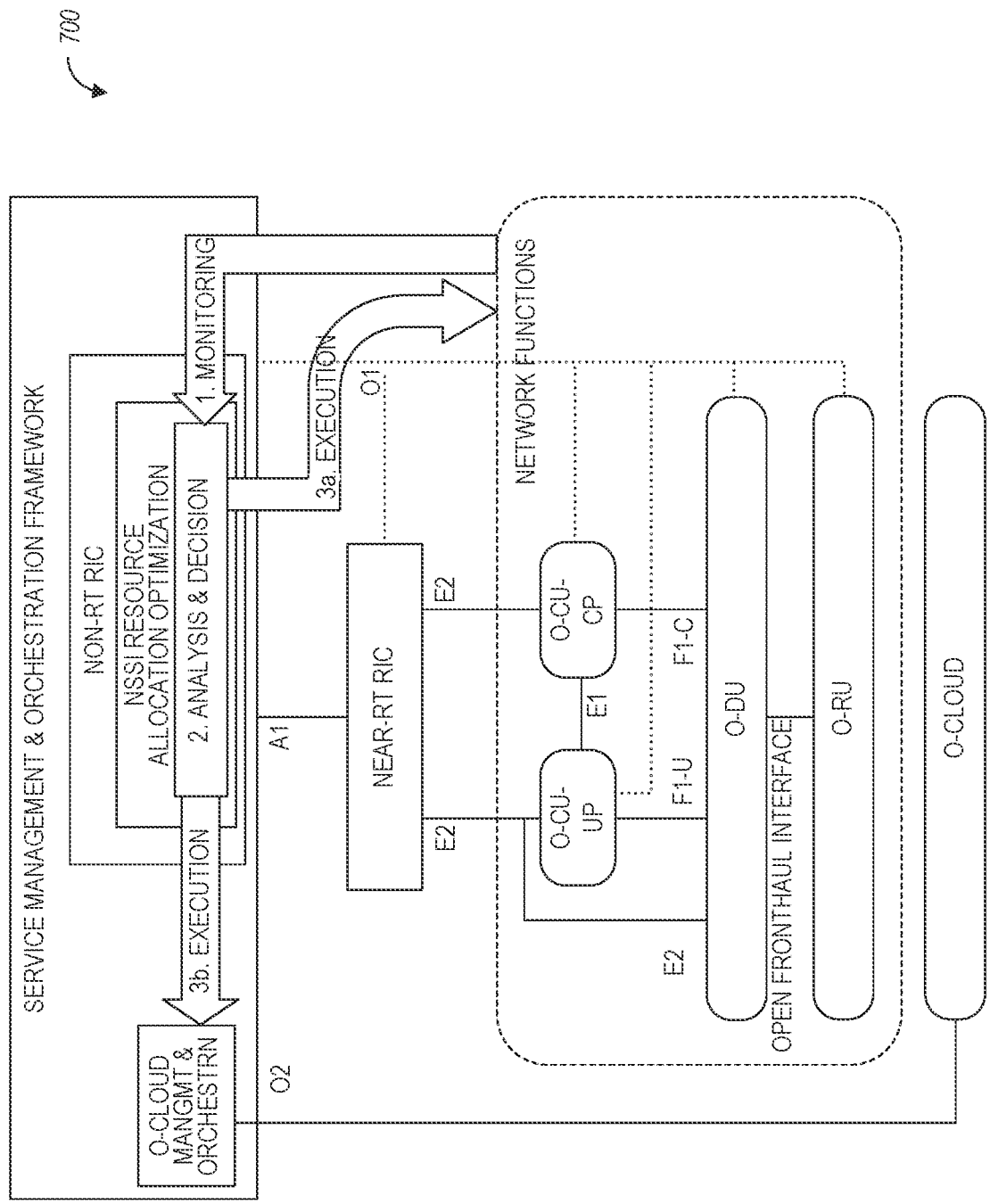
FIG. 7 illustrates an O-RAN system architecture with network slice subnet instance (NSSI) resource allocation optimization over O-RAN Non-Real Time (RT) RAN Intelligent Controller (RIC), in accordance with some aspects.

FIG. 7 illustrates an O-RAN system architecture 700 with network slice subnet instance (NSSI) resource allocation optimization over O-RAN Non-Real Time (RT) RAN Intelligent Controller (RIC), in accordance with some aspects. In some embodiments, the non-RT RIC (e.g., an NSSI resource allocation and optimization circuit of the non-RT RIC) may perform the following functions:

(1) Monitoring. For example, the non-RT RIC monitors the radio network(s) by collecting resource usage and performance-related data via the O1 interface, including the following performance measurements that are measured on per NSSI: downlink (DL) physical resource blocks (PRBs) used for data traffic; uplink (UL) PRBs used for data traffic; an average DL user equipment (UE) throughput in a next generation Node-B (gNB) of the O-RAN network; an average UL UE throughput in the gNB; a number of protocol data unit (PDU) sessions requested for setup in the O-RAN network; a number of PDU sessions successfully set up in the O-RAN network; and a number of PDU sessions failed to set up in the O-RAN network.

(2) Analysis and Decisions. For example, the non-RT RIC may analyze the data to train an A or ML model (referred collectively as AI/ML model), and then determine the actions needed to add or reduce the resources (e.g. capacity. VNF resources, slice subnet attributes, etc.) for the NSSI at a specific time and location.

(3) Execution. The non-RT RIC executes the actions (or functions) to adjust or reallocate network resources (e.g., NSSI resources) that include. Example actions include:

(3a) Re-configuring the NSSI attributes via an O1 interface: and (3b) Update the cloud resources via the O2 interface (which functionality may be performed by the O-Cloud Management and Orchestration function).

Entities/Resources Involved in the Use Case

Non-RT RIC is configured to perform the following functionalities:

a) Collecting the performance measurements related to NSSI resource usage from the O-RAN nodes via the O1 interface.

b) Training the AI/ML model based on the analysis of historical performance measurements, to predict the traffic demand patterns of NSSI at different times and locations.

c) Determining the time/date and locations (e.g., which O-RAN nodes) to add or reduce the resources (e.g., capacity, VNF resources, slice subnet attributes (TS 38.541 [y]), . . . etc.) for a given NSSI based on inference.

d) Performing the following action(s) to optimize the NSSI resource allocation, at the time determined by the AI/ML model: reconfiguring the NSSI attributes via the O1 interface, and updating the cloud resources via the O2 interface.

In some embodiments, the following RAN network functions (or RAN nodes) may be used for the monitoring and execution functionalities (functionalities 1 and 3 in FIG. 7): O-CU-CP, O-CU-UP, O-DU, and O-RU. Such RAN nodes are associated with the following functionalities:

a) Support the performance measurement collection with required granularity over the O1 interface; and b) Support the configuration related to the NSSI resource allocation update over the O1 interface.

In some embodiments, NSSI resource allocation optimization may be performed as detailed in TABLE 1 below.

TABLE 1

| Use case stage | Evolution/Specification | <<Uses>> Related use |
|---|---|---|
| Goal | To automatically optimize the NSSI resource allocation by leveraging the AI/ML model that was trained via the analysis of performance measurements collected from the RAN nodes. | |
| Actors and Roles | Non-RT RIC: analysis of performance measurements and AI/ML model training<br>RAN nodes (O-CU-CP, O-CU-UP, O-DU, O-RU): performance measurements collection and configuration changes execution<br>O-Cloud M&O: the cloud resources modification via the O2 interface | |
| Assumptions | - All relevant functions and components are instantiated.<br>- Non-RT RIC is able to receive performance measurements from RAN nodes via the O1 interface. | |
| Pre-conditions | - RAN is operational.<br>- Non-RT RIC has been collecting the RAN performance measurements from RAN nodes. | |
| Begins when | An AI/ML model has been trained based on the analysis of performance measurements predict the traffic demand patterns of NSSI at different times and locations. | |
| Step 1 (M) | Non-RT RIC determines the action based on model inference to update the NSSI resources that may include the following information:<br>a) the time/date,<br>b) locations (e.g. gNB ID),<br>c) NSSI ID,<br>d) slice subnet attributes [z],<br>e) VNF resources update (e.g. scaling in/out) | |
| Step 2 (M) | Non-RT RIC executes the action at the time determined by the model inference by performing the following operations:<br>a) re-configure the slice subnet attributes via the O1 interface,<br>b) request O-Cloud M&O to update the O-Cloud resources via the O2 interface. | |

TABLE 1-continued

| Use case stage | Evolution/Specification | <<Uses>> Related use |
|---|---|---|
| Ends when | All the steps identified above are successfully completed. | |
| Exceptions | One of the steps identified above fails. | |
| Post-conditions | Near-RT RIC continues monitoring the NSSI resource usages. | |
| Traceability | REQ-Non-RT-RIC-FUN1, REQ-Non-RT-RIC-FUN2, REQ-Non-RT-RIC-FUN3, REQ-Non-RT-RIC-FUN5, | |

Figure 8:
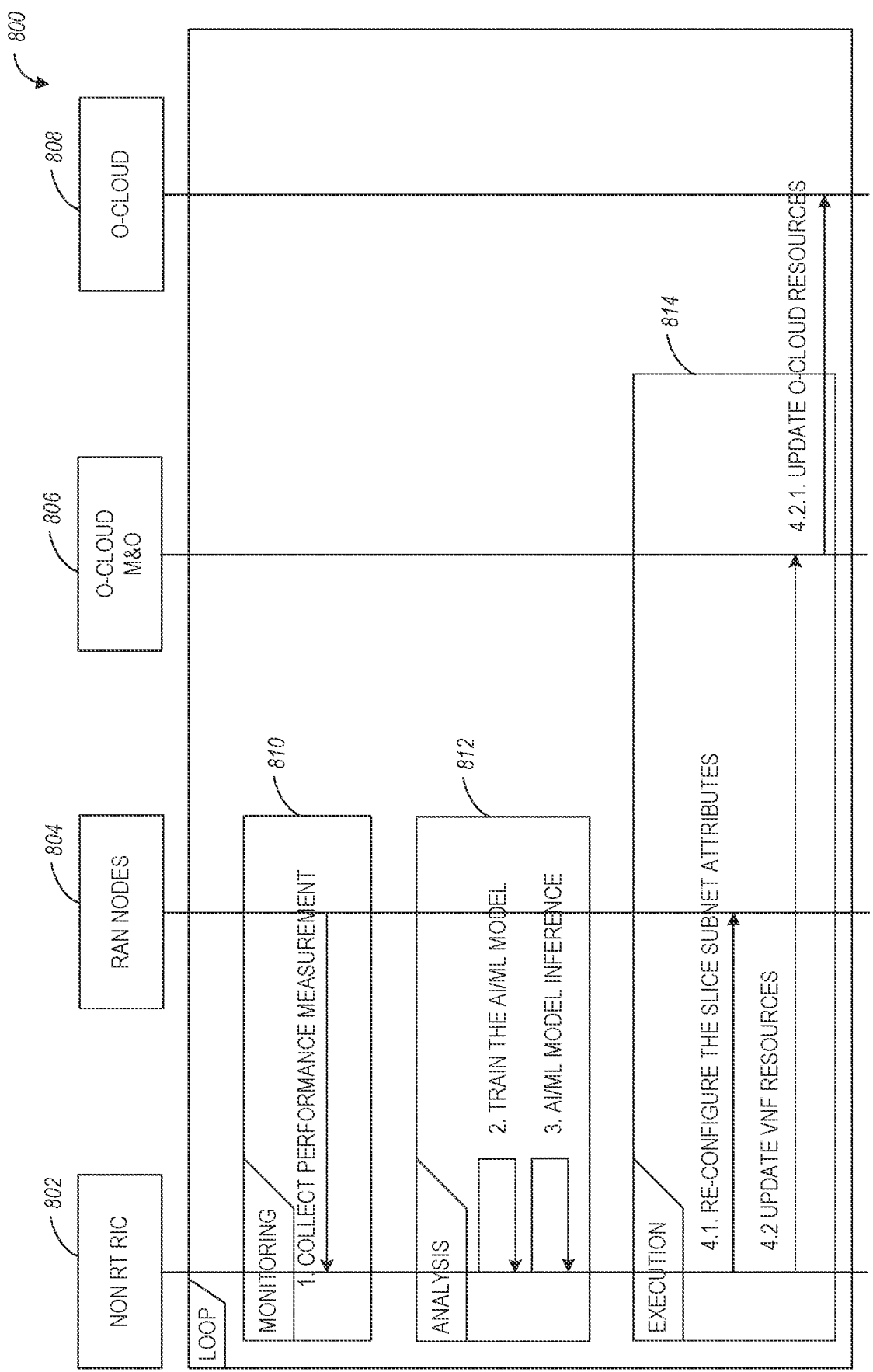
FIG. 8 illustrates a swimlane communication flow diagram for NSSI resource optimization, in accordance with some aspects.

FIG. 8 illustrates a swimlane communication flow diagram 800 for NSSI resource optimization, in accordance with some aspects. The communication flow may take place between the non-RT RIC 802, RAN nodes 804, O-Cloud Management and Orchestration (OCMO) 806, and O-Cloud 808.

At operation 810, the non-RT RIC 802 collects the performance measurements (e.g. data volume, the number of registered UEs, the number of PDU sessions, etc.) for NSSIs supporting the eMBB, URLLC, and/or mMTC services.

At operation 812 (e.g., functionality 2 in FIG. 8), the non-RT RIC 802 trains the AI/ML model based on the analysis of historical data such as prior performance measurements to predicts the traffic demand for each NSSI for a given time and location. At operation 812 (e.g., functionality 3 in FIG. 8), the non-RT RIC determines the action based on model inference to update the NSSI resources that may include the following NSSI identification information; time and date information associated with usage of the selected NSSI; next generation Node-B (gNB) IDs of gNBs associated with the selected NSSI; an NSSI ID of the selected NSSI; slice subnet attributes of the selected NSSI; and virtual network function (VNF) resources utilization by the selected NSSI.

At operation 814, the non-RT RIC 802 executes the action at the time determined by the model inference by performing the following operations: (functionality 4.1 in FIG. 8) reconfiguring the slice subnet attributes via the O1 interface, and (functionality 4.2 in FIG. 8) requesting OCMO 806 to update the VNF resources (e.g. scale in/out). The OCMO 806 updates the O-Cloud resources via the O2 interface.

Figure 9:
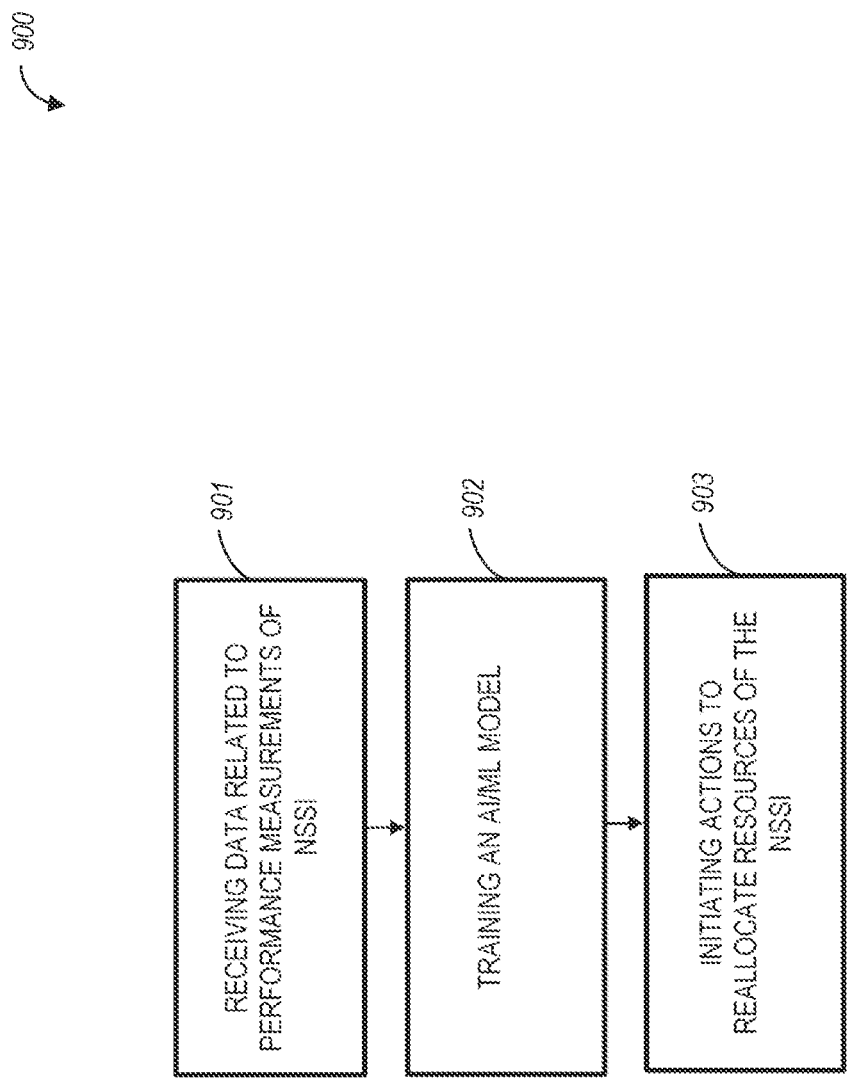
FIG. 9 is a flow chart of a process performed by an O-RAN non-RT RIC for NSSI resource allocation optimization, in accordance with some aspects.

FIG. 9 is a flow chart of a process 900 performed by an O-RAN non-RT RIC for NSSI resource allocation optimization, in accordance with some aspects. In some embodiments, the electronic device(s), network(s), system(s), chip(s) or component(s), or portions or implementations thereof, of FIGS. 1A-17, or some other figure herein, may be configured to perform one or more processes, techniques, or methods as described herein, or portions thereof. One such process is depicted in FIG. 9 and may be performed by a non-RT RIC.

Process 900 may include, at 901, receiving data related to performance measurements of NSSI. The data may be received from network functions over an O1 interface. The performance measurements may be based on a variety of performance metrics including, but not limited to, DL PRBs used for data traffic; UL PRBs used for data traffic; average DL UE throughput in gNB; average UL UE throughput in gNB; a number of PDU Sessions requested to set up; a number of PDU Sessions successfully setup; or a number of PDU Sessions failed to setup. The data may be received periodically or upon request.

Process 900 may further include, at 902, training an AI/ML model using the data. Once trained, the AI/ML model may generate a number of inferences about the network operation at various times/locations. The inferences may be used to determine actions to reallocate resources that will improve the operation of the NSSI.

The process may further include, at 903, initiating one or more of the actions to reallocate resources of the NSSI. The actions may be, for example, adding or reducing resources for a particular time/location. The resources may be, for example, capacity (e.g., processing, storage, etc.), VNF resources, or slice subnet attributes. In some embodiments, initiating the one or more actions may be performed by sending instructions to various nodes including, but not limited to, RAN nodes or OCMO nodes. The functionalities of process 900 may be executed in a loop where processing at 901 may resume after completion of processing at 903.

The objectives of the O-RAN Alliance are committed to evolving radio access networks, making them more open and smarter than previous generations, and will leverage real-time analytics to drive embedded machine learning systems and artificial intelligence back end modules in the RAN. The O-RAN will be deployed based on 3GPP-defined network slicing technologies.

Figure 10:
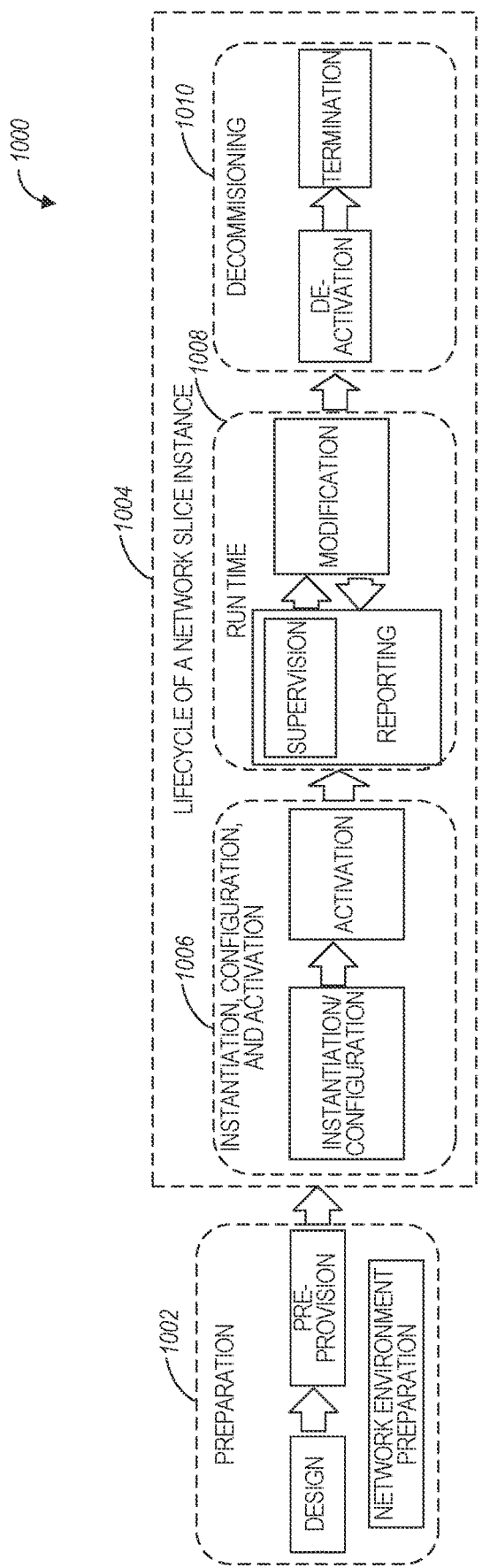
FIG. 10 illustrates management aspects of network slicing, in accordance with some aspects.

FIG. 10 illustrates a diagram 1000 of management aspects of network slicing, in accordance with some aspects. Referring to FIG. 10, the deployment of a network slice consists of the following four phases: preparation 1002 and a lifecycle 1004 of a network slice instance. The lifecycle 1004 includes commissioning 1006 (including instantiation, configuration, and activation), operation (or run time) 1008, and decommissioning 1010.

A network slice is a logical network that provides specific network capabilities and network characteristics. There are some aspects that a network slice includes. A deployed network slice forms a Network Slice Instance (NSI). An NSI has all the physical and logical resources and the functionalities to serve a business use case. The NSI contains Core Part and Access Part. To create an NSI, configurations, and policies are required for each instance. The NSI lifecycle includes an instantiation, configuration, and activation phase, a run-time phase, and a decommissioning phase as shown in FIG. 10.

In the preparation phase, the NSI does not exist. Creation and verification of the NSI are completed in this phase. Instantiation and configuration phases include the steps which are all the resources for NSI are prepared and NSI is ready to operate. In the activation phase, any action required to make NSI active is included. The run-time phase is the state that NSI is operating and supporting services to the specified types. Supervision, reporting, and modification phases are involved in the run-time phase. To illustrate, KPI reporting, reconfiguration of NSI, or scaling are used in these phases. Decommissioning phase involves the deactivation of the NSI and releasing of the resources assigned to it.

The disclosed techniques support the activation or deactivation of NSSIs containing O-RAN network functions.

Figure 11:
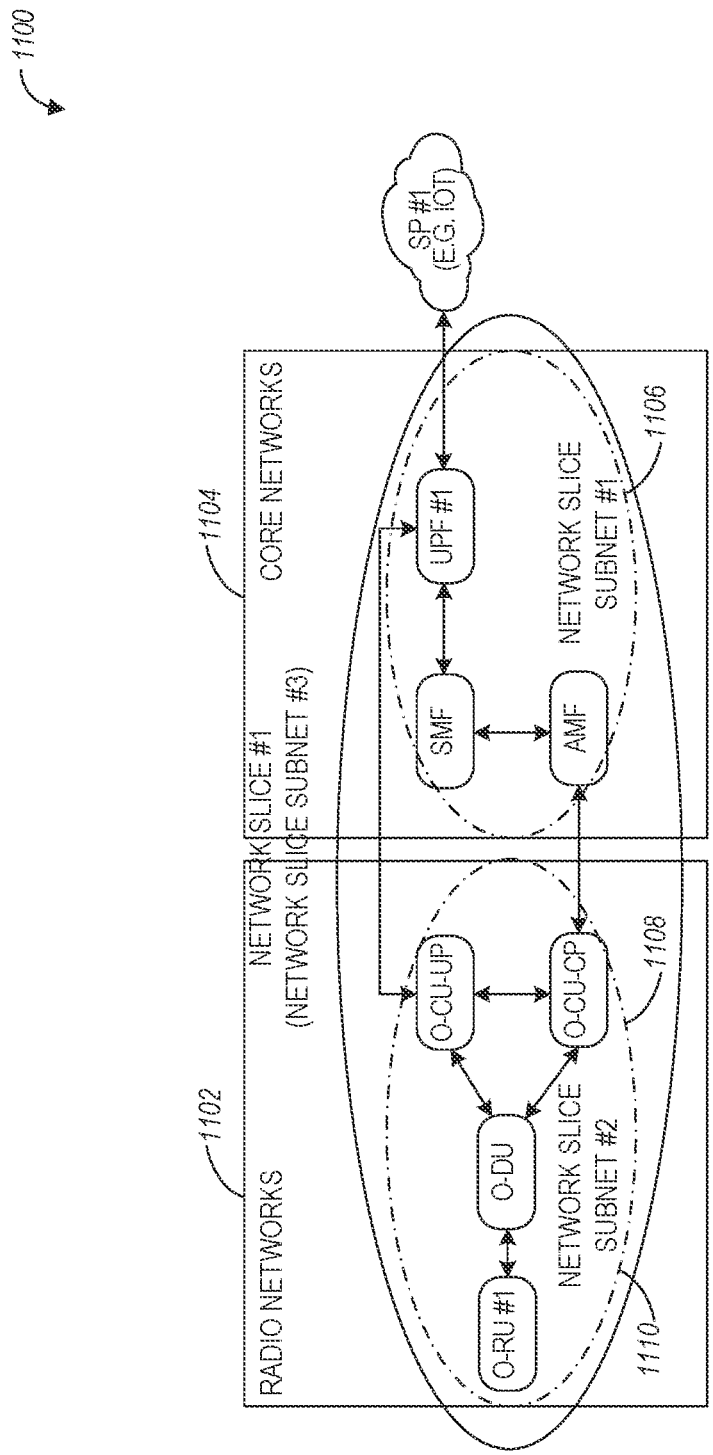
FIG. 11 illustrates a 5G network with network slicing, in accordance with some aspects.

FIG. 11 illustrates a 5G network 1100 with network slicing, in accordance with some aspects. More specifically, FIG. 11 shows an example of a 5G network 1100 realized by an end-to-end network slice, consisting of network slice subnet instance #1 1106 for 5G core networks 1104 and network slice subnet instance #2 1110 for 5G radio networks 1102.

Figure 12:
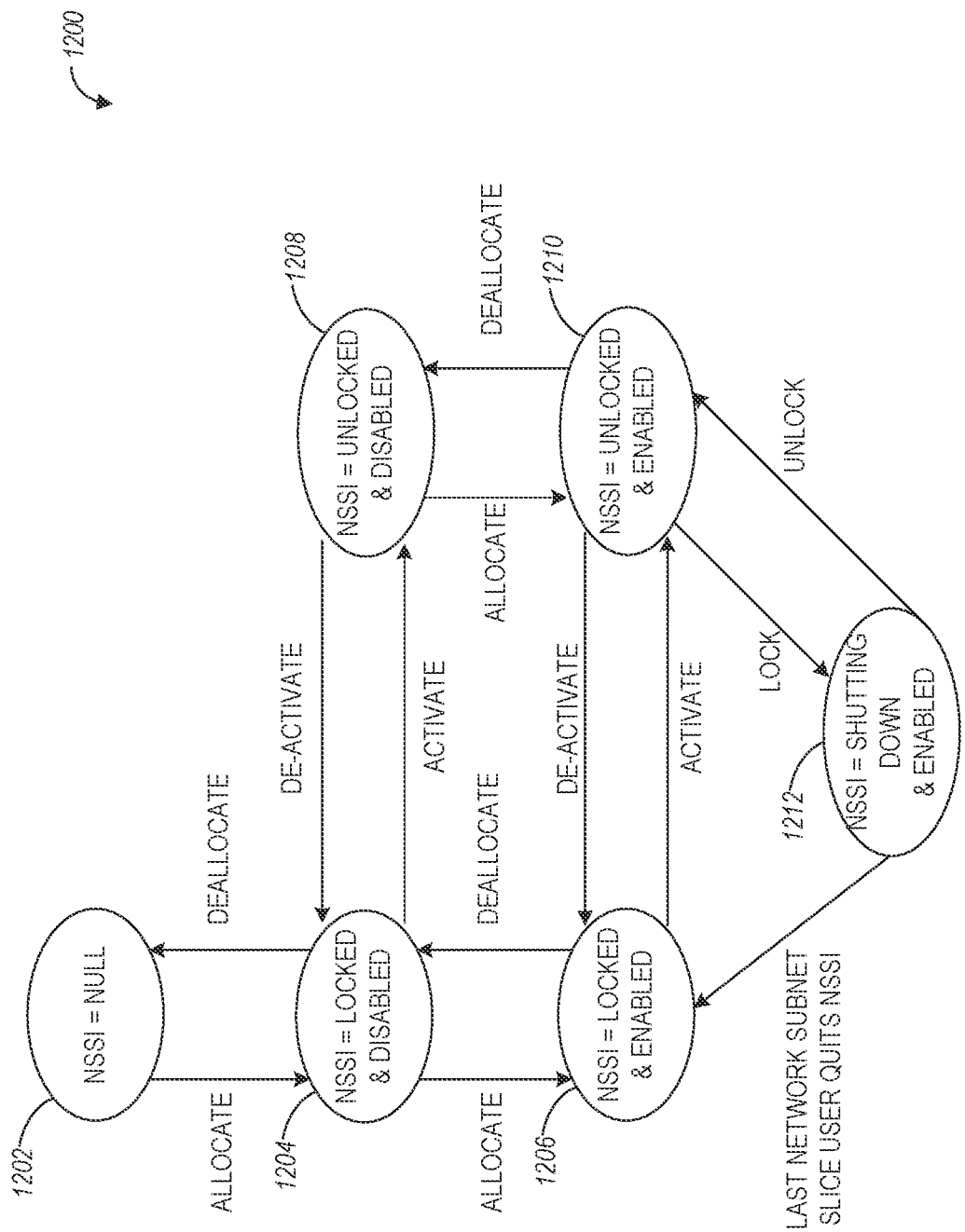
FIG. 12 illustrates an NSSI state diagram with state transition triggers, in accordance with some aspects.

FIG. 12 illustrates an NSSI state diagram 1200 with state transition triggers, in accordance with some aspects. Referring to FIG. 12, example NSSI states include the following states: null 1202, locked and disabled 1204, locked and enabled 1206, unlocked and disabled 1208, unlocked and enabled 1210, and shutting down and enabled 1212.

The NSSI state diagram 1200 shows the relation between NSSI operation (e.g. activation, deactivation) and NSSI states represented by operationalState and administrativeState (e.g., as discussed in clause 6.4.1 in TS 28.541) and the following TABLE 2:

TABLE 2

| operationalState | It indicates the operational state of the network slice instance or the network slice subnet instance. It describes whether or not the resource is physically installed and working. allowedValues: "ENABLED", "DISABLED". The meaning of these values is as defined in 3GPP TS 28.625 [17] and ITU-T X.731 [18]. | type: ENUM multiplicity: 1 isOrdered: N/A is Unique: N/A defaultValue: None allowedValues: N/A isNullable: False |
|---|---|---|
| administrativeState | It indicates the administrative state of the network slice instance or the network slice subnet instance. It describes the permission to use or prohibition against using the instance, imposed through the OAM services. allowedValues: "LOCKED", "UNLOCKED", SHUTTINGDOWN" The meaning of these values is as defined in 3GPP TS 28.625 [17] and ITU-T X. 731 [18]. | type: ENUM multiplicity: 1 isOrdered: N/A isUnique: N/A defaultValue: None allowedValues: N/A isNullable: False |

Figure 13:
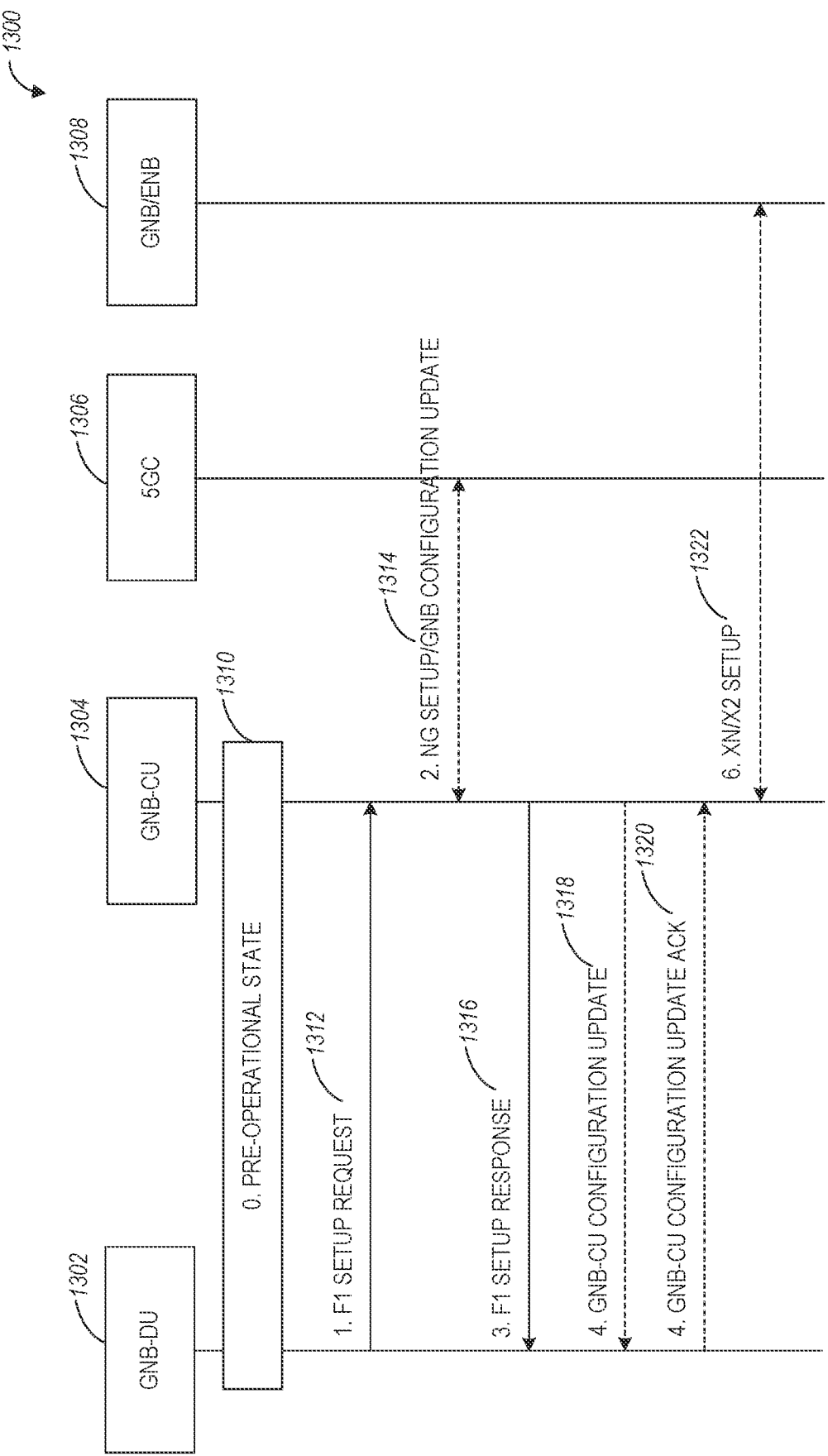
FIG. 13 illustrates a swimlane communication flow diagram for F1 startup and cell activation, in accordance with some aspects.

FIG. 13 illustrates a swimlane communication flow diagram 1300 for F1 startup and cell activation, in accordance with some aspects. Referring to FIG. 13, the illustrated functionalities are associated with a gNB-DU 1302, gNB-CU 1304, 5GC 1306, and gNB/eNB 1308.

FIG. 12 and FIG. 13 show the relation between the administrative state and the pre-operation state 1310 of the gNB-DU Cell, where the administrative state indicates the permission to use or prohibition against using the cell, imposed through the OAM services. The administrative state has three values: "LOCKED", "SHUTTING DOWN," or "UNLOCKED."

If the operationalState is "ENABLED" (i.e., the resource is physically installed and working) and if the administrativeState is "UNLOCKED." the step "0: Pre-operational state" 1310 will exit, and the step "1: F1 Setup Request" 1312 will be executed. Additional steps include NG setup or gNB configuration update 1314, F1 setup response 1316, gNB-CU configuration update 1318, gNB-CU configuration update acknowledgement 1320, and XN/X2 setup 1322.

F1 Startup and Cells Activation

This function allows to set up the F1 interface between a gNB-DU and a gNB-CU and it allows to activate the gNB-DU cells.

Therefore, the activation and deactivation of an NSSI are to change its administrativeState to "unlocked" and "unlocked", respectively.

The disclosed techniques include four use cases of O-RAN Slice Subnet Instance activation and deactivation.

TABLE 3 below illustrates O-RAN Slice Subnet Instance with O-DU constituent activation use case.

TABLE 3

| Use Case Stage | Evolution/Specification | <<Uses>> Related use |
|---|---|---|
| Goal | Activation of an O-RAN network slice subnet instance (O-NSSI) with PNF O-DU constituent (see clause 5.1.10 in TS 28.531 [14]). | |
| Actors and Roles | NSSMS_C such as NSMF acts as an example network slice subnet management service consumer.<br>NSSMS_P such as NSSMF acts as an example of a network slice subnet management service provider.<br>NFMS_P, who acts as an example of a network function management service provider.<br>O-RAN: Network Functions, such as Near-RT RIC. O-CU-CP, O-CU-UP, or O-DU. | |
| Assumptions | NSSMS_P is providing services to authorized consumers. | |
| Pre conditions | An O-NSSI has been created with O-DU physically installed (i.e. operationalState = enabled), but not yet activated (i.e. administrativeState = locked) (see FIG. B.2.2 in TS 28.541 [6]). | |
| Begins when | NSSMS_C decides to activate an O-NSSI. | |
| Step 1 (M) | NSSMS_C invokes NSSI Provisioning service with operation modifyMOIAttributes (see table 6.2-1 in TS 28.531 [14])) to request NSSMS_P to activate the O-NSSI that is to change administrativeState of the O-NSSI to unlocked. | |
| Step 2 (M) | NSSMS_P finds that the O-NSSI has a constituent (i.e. NF—O-DU), and invokes NF Provisioning service with operation modifyMOIAttributes (see table 6.3-1 in TS 28.531 [14])) to request NFMS_P to activate the O-DU that is to change administrativeState of the O-DU to unlocked.<br>O-DU starts to establish the F1 interface connection with O-CU, (see Annex A.1 in TS 28.541 [6]). | |
| Step 3 (M) | NFMS_P invokes NF Provisioning data report service with notification notifyMOIAttributeValueChanges (see table 6.3-1 in TS 28.531 [14])) to notify NSSMS_P that the O-DU NF has been activated | |
| Step 4 (M) | NSSMS_P changes administrativeState of the O-NSSI to unlocked and invokes NSSI Provisioning data report service with notification notifyMOIAttributeValueChanges (see table 6.2-1 in TS 28.531 [14])) to notify NSSMS C that the O-NSSI has been activated. | |
| Ends when | O-RAN O-NSSI is activated | |
| Exceptions | One of the steps identified above fails | |
| Post Conditions | O-NSSI is in operation | |
| Traceability | REQ-SL-FUN21 | |

TABLE 4 below illustrates O-RAN Slice Subnet Instance with O-RU constituent activation use case.

TABLE 4

| Use Case Stage | Evolution/Specification | <<Uses>> Related use |
|---|---|---|
| Goal | Activation of an O-RAN network slice subnet instance (O-NSSI) with O-RU constituent (see clause 5.1.10 in TS 28.531 [14]). | |
| Actors and Roles | NSSMS_C such as NSMF acts as an example network slice subnet management service consumer.<br>NSSMS_P such as NSSMF acts as an example of a network slice subnet management service provider.<br>NFMS_P, who acts as an example of a network function management service provider. | |

TABLE 4-continued

| Use Case Stage | Evolution/Specification | <<Uses>> Related use |
|---|---|---|
| | O-RAN: Network Functions, such as Near-RT RIC. O-CU-CP, O-CU-UP, O-DU, or O-RU. | |
| Assumptions | NSSMS_P is providing services to authorized consumers. | |
| Pre conditions | An O-NSSI has been created with O-RU physically installed (i.e. operationalState = enabled), but not yet activated (i.e. administrativeState = locked) (see FIG. B.2.2 in TS 28.541 [6]). | |
| Begins when | NSSMS_C decides to activate an O-NSSI. | |
| Step 1 (M) | NSSMS_C invokes NSSI Provisioning service with operation modifyMOIAttributes (see table 6.2-1 in TS 28.531 [14])) to request NSSMS_P to activate the O-NSSI that is to change administrativeState of the O-NSSI to unlocked. | |
| Step 2 (M) | NSSMS_P identifies inactive constituents (e.g. NSSI, NF) of the NSSI and decides to activate those constituents. | |
| Step 3 (M) | NSSMS_P finds that the O-NSSI has a constituent (i.e. NF—O-RU), and invokes NF Provisioning service with operation modifyMOIAttributes (see table 6.3-1 in TS 28.531 [14])) to request NFMS_P to activate the O-RU that is to change administrativeState of the O-DU to unlocked.<br>O-RU starts to establish the fronthaul interface connection with O-DU. | |
| Step 4 (M) | NFMS_P invokes NF Provisioning data report service with notification notifyMOIAttributeValueChanges (see table 6.3-1 in TS 28.531 [14])) to notify NSSMS_P that the O-DU NF has been activated. | |
| Step 5 (M) | NSSMS_P changes administrativeState of the O-NSSI to unlocked and invokes NSSI Provisioning data report service with notification notifyMOIAttributeValueChanges (see table 6.2-1 in TS 28.531 [14])) to notify NSSMS C that the O-NSSI has been activated. | |
| Ends when | O-RAN O-NSSI is activated | |
| Exceptions | One of the steps identified above fails | |
| Post Conditions | O-NSSI is in operation | |
| Traceability | REQ-SL-FUN21 | |

TABLE 5 illustrates O-RAN Slice Subnet Instance with O-DU constituent deactivation use case.

TABLE 5

| Use Case Stage | Evolution/Specification | <<Uses>> Related use |
|---|---|---|
| Goal | Deactivation of an O-RAN network slice subnet instance (O-NSSI) with PNF O-DU constituent (see clause 5.1.10 in TS 28.531 [14]). | |
| Actors and Roles | NSSMS_C such as NSMF acts as an example network slice subnet management service consumer.<br>NSSMS_P such as NSSMF acts as an example of a network slice subnet management service provider.<br>NFMS_P, who acts as an example of a network function management service provider.<br>O-RAN: Network Functions, such as Near-RT RIC. O-CU-CP, O-CU-UP, or O-DU. | |

TABLE 5-continued

| Use Case Stage | Evolution/Specification | <<Uses>> Related use |
|---|---|---|
| Assumptions | NSSMS_P is providing services to authorized consumers. | |
| Pre conditions | An O-NSSI has been created with O-DU physically installed (i.e. operationalState = enabled), and activated (i.e. administrativeState = unlocked) (see FIG. B.2.2 in TS 28.541 [6]). | |
| Begins when | NSSMS_C decides to deactivate an O-NSSI. | |
| Step 1 (M) | NSSMS_C invokes NSSI Provisioning service with operation modifyMOIAttributes (see table 6.2-1 in TS 28.531 [14])) to request NSSMS_P to deactivate the O-NSSI that is to change administrativeState of the O-NSSI to locked. | |
| Step 2 (M) | NSSMS_P identifies inactive constituents (e.g. NSSI, NF) of the NSSI and decides to activate those constituents. | |
| Step 3 (M) | NSSMS_P finds that the O-NSSI has a constituent (i.e. NF—O-DU), and invokes NF Provisioning service with operation modifyMOIAttributes (see table 6.3-1 in TS 28.531 [14])) to request NFMS_P to activate the O-DU that is to change administrativeState of the O-DU to locked. O-DU starts to terminate the F1 interface connection with O-CU, (see Annex A.1 in TS 28.541 [6]). | |
| Step 4 (M) | NFMS P invokes NF Provisioning data report service with notification notifyMOIAttributeValueChanges (see table 6.3-1 in TS 28.531 [14])) to notify NSSMS_P that the O-DU NF has been deactivated. | |
| Step 5 (M) | NSSMS_P changes administrativeState of the O-NSSI to locked and invokes NSSI Provisioning data report service with notification notifyMOIAttributeValueChanges (see table 6.2-1 in TS 28.531 [14])) to notify NSSMS C that the O-NSSI has been deactivated. | |
| Ends when | O-RAN O-NSSI is deactivated | |
| Exceptions | One of the steps identified above fails | |
| Post Conditions | O-NSSI is in operation | |
| Traceability | REQ-SL-FUN22 | |

TABLE 6 illustrates O-RAN Slice Subnet Instance with O-RU constituent deactivation use case.

TABLE 6

| Use Case Stage | Evolution/Specification | <<Uses>> Related use |
|---|---|---|
| Goal | Deactivation of an O-RAN network slice subnet instance (O-NSSI) with O-RU constituent (see clause 5.1.10 in TS 28.531 [14]). | |
| Actors and Roles | NSSMS_C such as NSMF acts as an example network slice subnet management service consumer. NSSMS_P such as NSSMF acts as an example of a network slice subnet management service provider. NFMS_P, who acts as an example of a network function management service provider. O-RAN: Network Functions, such as Near-RT RIC. O-CU-CP, O-CU-UP, O-DU, or O-RU. | |

TABLE 6-continued

| Use Case Stage | Evolution/Specification | <<Uses>> Related use |
|---|---|---|
| Assumptions | NSSMS_P is providing services to authorized consumers. | |
| Pre conditions | An O-NSSI has been created with O-RU physically installed (i.e. operationalState = enabled), and activated (i.e. administrativeState = locked) (see FIG. B.2.2 in TS 28.541 [6]). | |
| Begins when | NSSMS_C decides to deactivate an O-NSSI. | |
| Step 1 (M) | NSSMS_C invokes NSSI Provisioning service with operation modifyMOIAttributes (see table 6.2-1 in TS 28.531 [14])) to request NSSMS_P to deactivate the O-NSSI that is to change administrativeState of the O-NSSI to locked. | |
| Step 2 (M) | NSSMS_P finds that the O-NSSI has a constituent (i.e. NF—O-RU), and invokes NF Provisioning service with operation modifyMOIAttributes (see table 6.3-1 in TS 28.531 [14])) to request NFMS_P to deactivate the O-RU that is to change administrativeState of the O-DU to locked. O-RU starts to terminate the fronthaul interface connection with O-DU. | |
| Step 3 (M) | NFMS_P invokes NF Provisioning data report service with notification notifyMOIAttributeValueChanges (see table 6.3-1 in TS 28.531 [14])) to notify NSSMS_P that the O-DU NF has been deactivated. | |
| Step 4 (M) | NSSMS_P changes administrativeState of the O-NSSI to locked and invokes NSSI Provisioning data report service with notification notifyMOIAttribute ValueChanges (see table 6.2-1 in TS 28.531 [14])) to notify NSSMS_C that the O-NSSI has been deactivated. | |
| Ends when | O-RAN O-NSSI is deactivated | |
| Exceptions | One of the steps identified above fails | |
| Post Conditions | O-NSSI is in operation | |
| Traceability | REQ-SL-FUN22 | |

Figure 14:
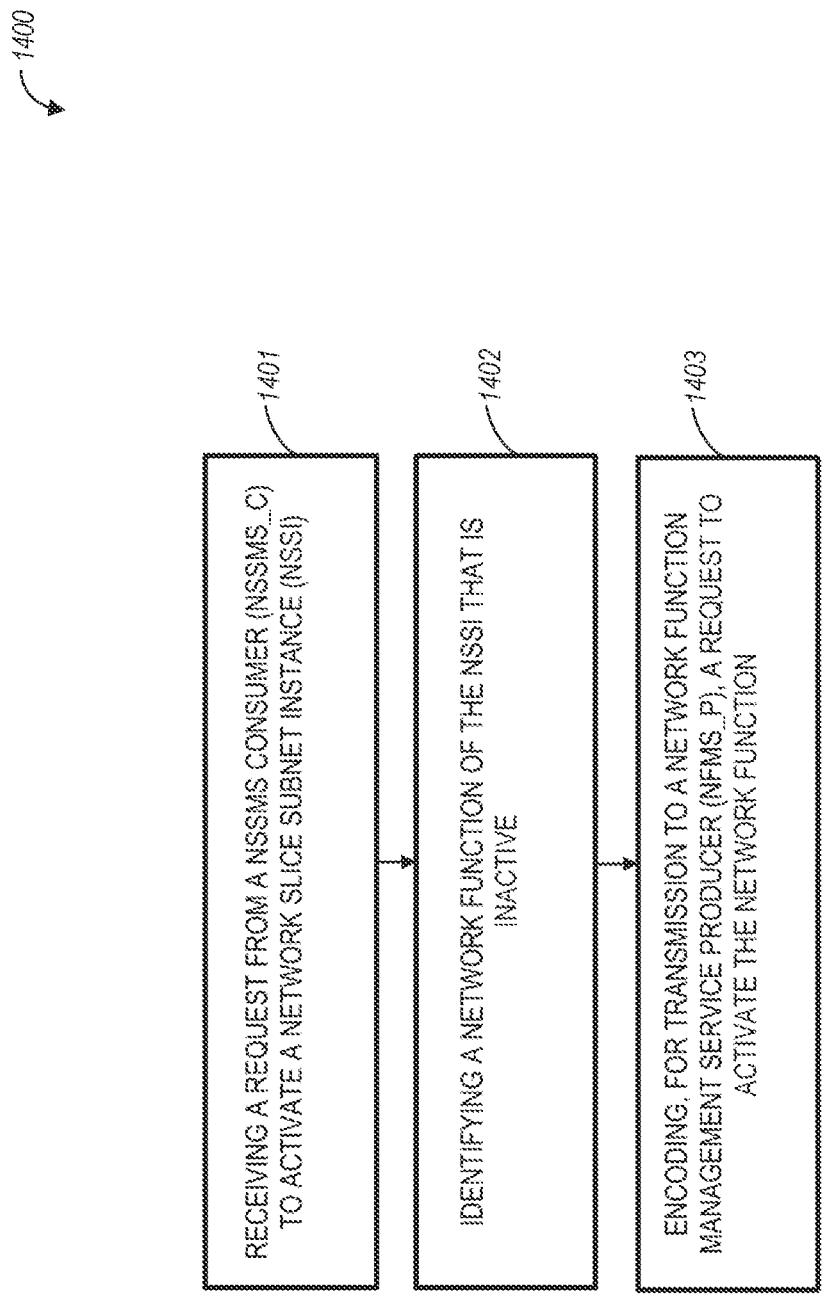
FIG. 14, FIG. 15, and FIG. 16 are flow charts of processes performed by an O-RAN network slice subnet management service (NSSMS) producer (NSSMS_P) or a portion thereof, in accordance with some aspects.
Figure 15:
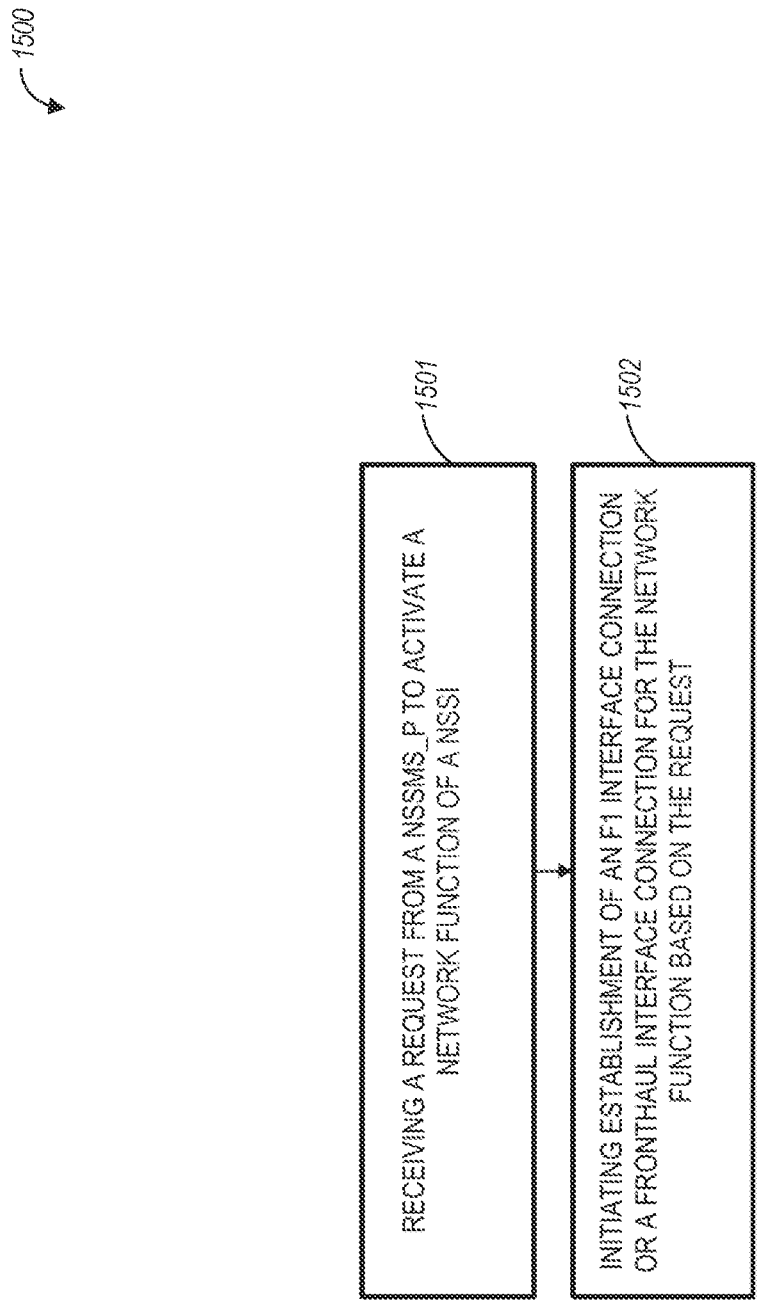
Figure 16:
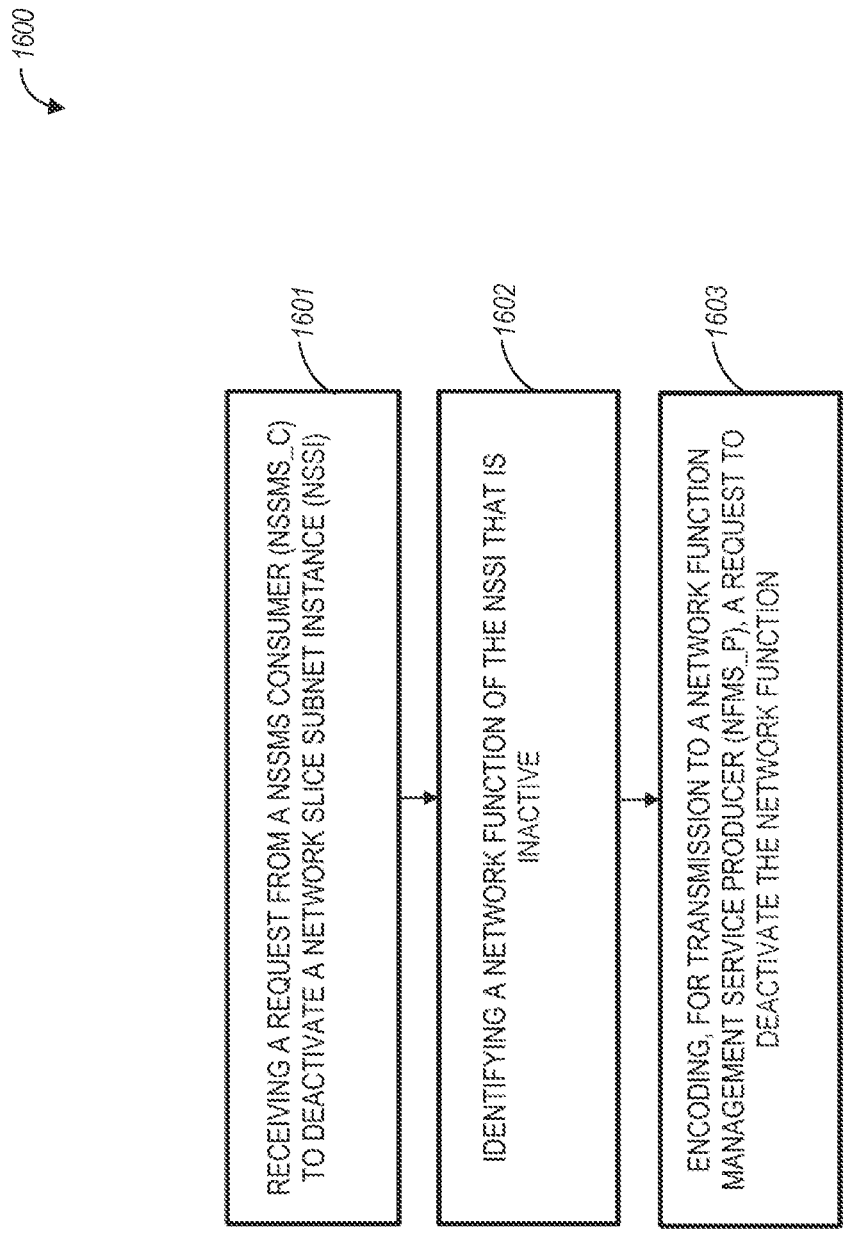

FIG. 14, FIG. 15, and FIG. 16 are flow charts of processes performed by an O-RAN network slice subnet management service (NSSMS) producer (NSSMS_P) or a portion thereof, in accordance with some aspects.

FIG. 14 is a flowchart of a process 1400. Process 1400 may include, at 1401, receiving a request from an NSSMS consumer (NSSMS_C) to activate a network slice subnet instance (NSSI). At 1402, process 1400 may further include identifying a network function of the NSSI that is inactive. For example, the network function may be an O-DU or an O-RU. At 1403, process 1400 may further include encoding, for transmission to a network function management service producer (NFMS_P), a request to activate the network function. For example, a network function management service consumer (NFMS_C) may request to activate the network function by consuming the network function (NF) provisioning service with operation modifyMOIAttribute to change administrativeState to unlocked.

FIG. 15 is a flowchart of a process 1500. Process 1500 may include, at 1501, receiving a request from an NSSMS_P to activate a network function of an NSSI. For example, the network function may be an O-DU or an O-RU. At 1502, process 1500 may further include initiating the establishment of an F1 interface connection or a fronthaul interface connection for the network function based on the request. For example, the F1 interface connection may be between an O-DU and an O-CU. Additionally, or the fronthaul interface connection may be between an O-DU and an O-RU.

FIG. 16 is a flowchart of a process 1600. For example, process 1600 may include, at 1601, receiving a request from an NSSMS consumer (NSSMS_C) to deactivate a network slice subnet instance (NSSI). At 1602, process 1600 may further include identifying a network function of the NSSI that is inactive. For example, the network function may be an O-DU or an O-RU. At 1603, the process may further include encoding, for transmission to a network function management service producer (NFMS_P), a request to deactivate the network function. For example, NFMS_C may request to deactivate the network function by consuming the network function (NF) provisioning service with operation modifyMOIAttribute to change administrativeState to locked.

In some embodiments, an apparatus includes memory and processing circuitry configured to operate as a network slice subnet management service producer NSSMS_P, where the processing circuitry is to: receive a request from NSSMS consumer (NSSMS_C) to activate the network slice subnet instance (NSSI); identify inactive constituents (e.g. NSSI, NF) of the NSSI; invoke NF Provisioning service for with operation modifyMOIAttributes to request network function management service producer (NFMS_P) to activate the NF (e.g. O-DU, O-RU): receive a notification from NFMS_P indicating the NF has been activated; and send a notification to (NSSMS_C) indicating the NF has been activated.

In some embodiments, upon receiving a notification from NFMS_P indicating the NF has been activated, NSSMS_P to change administrativeState of the NF to unlocked.

In some aspects, the NF can be O-RU or O-DU. In some embodiments, upon receiving an activation request from NSSMS_P, NFMS_P starts to establish the F1 interface connection between O-DU and O-CU. In some embodiments, upon receiving an activation request from NSSMS_P, NFMS_P starts to establish the fronthaul interface connection between O-DU and O-RU.

In some aspects, an apparatus includes memory and processing circuitry configured to operate as a network slice subnet management service producer NSSMS_P. The processing circuitry is to: receive a request from NSSMS consumer (NSSMS_C) to deactivate the network slice subnet instance (NSSI): identify inactive constituents (e.g. NSSI, NF) of the NSSI; invoke NF Provisioning service for with operation modifyMOIAttributes to request network function management service producer (NFMS_P) to deactivate the NF (e.g. O-DU, O-RU); receive a notification from NFMS_P indicating the NF has been deactivated; and send a notification to (NSSMS_C) indicating the NF has been deactivated.

In some embodiments, upon receiving a notification from NFMS_P indicating the NF has been deactivated, NSSMS_P to change administrativeState of the NF to locked. In some embodiments, the NF can be O-RU or O-DU. In some aspects, upon receiving an activation request from NSSMS_P, NFMS_P starts to terminate the F1 interface connection between O-DU and O-CU. In some aspects, upon receiving an activation request from NSSMS_P, NFMS_P starts to terminate the fronthaul interface connection between O-DU and O-RU.

Figure 17:
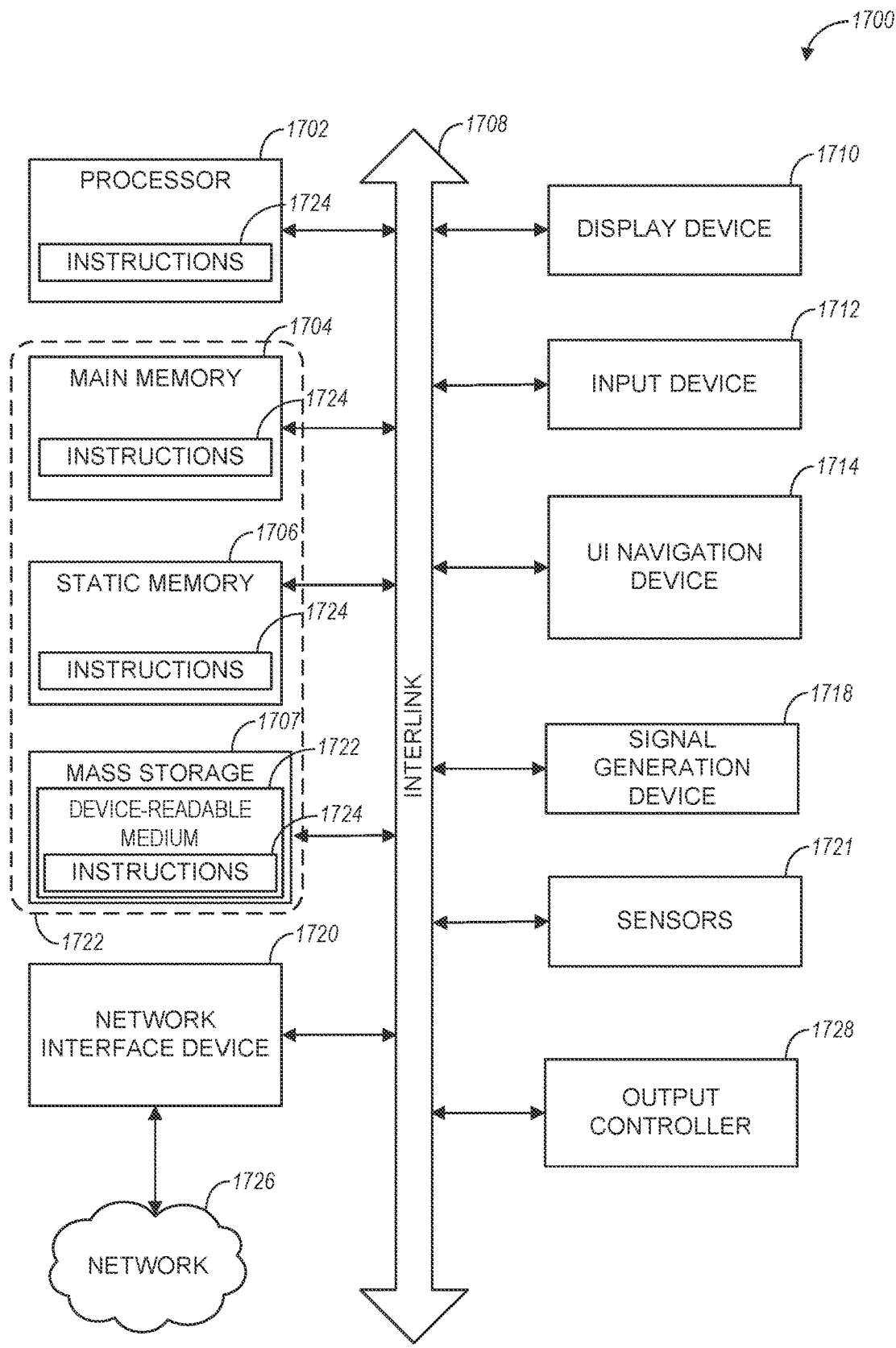
FIG. 17 illustrates a block diagram of a communication device such as an evolved Node-B (eNB), a new generation Node-B (gNB) (or another RAN node), an access point (AP), a wireless station (STA), a mobile station (MS), or a user equipment (UE), in accordance with some aspects.

FIG. 17 illustrates a block diagram of a communication device such as an evolved Node-B (eNB), a new generation Node-B (gNB) (or another RAN node), an access point (AP), a wireless station (STA), a mobile station (MS), or a user equipment (UE), in accordance with some aspects and to perform one or more of the techniques disclosed herein. In alternative aspects, the communication device 1700 may operate as a standalone device or may be connected (e.g., networked) to other communication devices.

Circuitry (e.g., processing circuitry) is a collection of circuits implemented in tangible entities of the device 1700 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1700 follow.

In some aspects, the device 1700 may operate as a standalone device or may be connected (e.g., networked) to other devices. In a networked deployment, the communication device 1700 may operate in the capacity of a server communication device, a client communication device, or both in server-client network environments. In an example, the communication device 1700 may act as a peer communication device in a peer-to-peer (P2P) (or other distributed) network environment. The communication device 1700 may be a UE, eNB, PC, a tablet PC, an STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 1700 may include a hardware processor 1702 (e.g., a central processing unit (CPU), a graphics processing unit (GPU), a hardware processor core, or any combination thereof), a main memory 1704, a static memory 1706, and mass storage 1707 (e.g., hard drive, tape drive, flash storage, or other block or storage devices), some or all of which may communicate with each other via an interlink (e.g., bus) 1708.

The communication device 1700 may further include a display device 1710, an alphanumeric input device 1712 (e.g., a keyboard), and a user interface (UI) navigation device 1714 (e.g., a mouse). In an example, the display device 1710, input device 1712, and UI navigation device 1714 may be touchscreen display. The communication device 1700 may additionally include a signal generation device 1718 (e.g., a speaker), a network interface device 1720, and one or more sensors 1721, such as a global positioning system (GPS) sensor, compass, accelerometer, or another sensor. The communication device 1700 may include an output controller 1728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1707 may include a communication device-readable medium 1722, on which is stored one or more sets of data structures or instructions 1724 (e.g., software) embodying or utilized by any one or more of the techniques or functions described herein. In some aspects, registers of the processor 1702, the main memory 1704, the static memory 1706, and/or the mass storage 1707 may be, or include (completely or at least partially), the device-readable medium 1722, on which is stored the one or more sets of data structures or instructions 1724, embodying or utilized by any one or more of the techniques or functions described herein. In an example, one or any combination of the hardware processor 1702, the main memory 1704, the static memory 1706, or the mass storage 1716 may constitute the device-readable medium 1722.

As used herein, the term "device-readable medium" is interchangeable with "computer-readable medium" or "machine-readable medium". While the communication device-readable medium 1722 is illustrated as a single medium, the term "communication device-readable medium" may include a single medium or multiple media (e.g., a centralized or distributed database, and/or associated caches and servers) configured to store the one or more instructions 1724. The term "communication device-readable medium" is inclusive of the terms "machine-readable medium" or "computer-readable medium", and may include any medium that is capable of storing, encoding, or carrying instructions (e.g., instructions 1724) for execution by the communication device 1700 and that causes the communication device 1700 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

Instructions 1724 may further be transmitted or received over a communications network 1726 using a transmission medium via the network interface device 1720 utilizing any one of a number of transfer protocols. In an example, the network interface device 1720 may include one or more physical jacks (e.g., Ethernet, coaxial, or phone jacks) or one or more antennas to connect to the communications network 1726. In an example, the network interface device 1720 may include a plurality of antennas to wirelessly communicate using at least one single-input-multiple-output (SIMO), MIMO, or multiple-input-single-output (MISO) techniques. In some examples, the network interface device 1720 may wirelessly communicate using Multiple User MIMO techniques.

The term "transmission medium" shall be taken to include any intangible medium that is capable of storing, encoding, or carrying instructions for execution by the communication device 1700, and includes digital or analog communications signals or another intangible medium to facilitate communication of such software. In this regard, a transmission medium in the context of this disclosure is a device-readable medium.

Example Aspects

In some aspects, an O-RAN system includes SMO, near-RT RIC, non-RT RIC. O-eNB, O-CU, O-DU, O-RU, NMS, A1, E2, O1, and O2 interfaces. In some embodiments, in an O-RAN system, a UE performs smart traffic management, handovers, and efficient mobility management. In some embodiments, the O-RAN system of disclosed examples includes support for multi-accesses including support for the following scenarios as shown in FIGS. 7-17 and implement the O-RAN architecture as shown in FIGS. 7-17. In some embodiments, the following spectrum use aspects may be used: carrier aggregation between licensed band NR (Primary Cell) and NR-U (Secondary Cell); dual connectivity between licensed band NR (Primary Cell) and NR-U (Secondary Cell): dual connectivity between licensed band LTE (Primary Cell) and NR-U (Secondary Cell): and dual connectivity between licensed band NR/LTE (Primary Cell) and Wi-Fi (Secondary Cell). In some embodiments, an O-RAN system of any disclosed examples is associated with the non-RT RIC providing enhanced policies over the A1 interface taking into account various UE related factors such as spectrum utilization by different UEs based on their traffic patterns, speeds of different UEs, mobility patterns, QoS/QCI characteristics, load balancing information, UE subscription, type of service requested by UEs or traffic class (tile time versus non-real-time, data versus voice, etc.). This may include big data analysis and policies based on advanced "smart mobility" use cases. In some embodiments, the non-RT RIC provides enhanced policies over the A1 interface taking into account various network-related factors such as load conditions (on CU and DU), location of cells relative to UEs, etc. In some embodiments, the non-RT RIC provides enhanced policies over A1 interface to near-RT RIC which results in policy-based cell selection, reselection, dynamic bearer management in terms of bearer selection (Master Cell Group (MCG) bearer, Secondary Cell Group (SCG) bearer, Split bearer), bearer type change across different frequency bands. In some embodiments, the near-RT RIC may enforce the policies received over the A1 interface using the E2 interface and other network components. In some embodiments, the non-RT RIC collects measurement data and other KPIs to verify the enforcement of policies as part of closed-loop system implementation. These include measurement reports with RSRP/RSRQ/CQI information for serving and neighboring cells and intra-RAT and inter-RAT measurement reports, cell quality thresholds, CGI reports, and measurement gaps on per-UE or per-frequency. In some embodiments, the non-RT RIC provides updated policies over the A1 interface to near-RT RIC which results in deletion of previously sent policies once the system has achieved the desired level of balance and control.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus for a Non-Real-Time RAN Intelligent Controller (Non-RT RIC) of a Service Management and Orchestration (SMO) entity of an Open Radio Access Network (O-RAN), the apparatus comprising:
processing circuitry, wherein to configure the Non-RT RIC for allocation of network slice subnet instance (NSSI) resources in the O-RAN, the processing circuitry is to:
collect performance measurements related to usage of the NSSI resources;
train an artificial intelligence (AI)/machine learning (ML) model based on the performance measurements; and
optimize the allocation of the NSSI resources at a particular time and a particular O-RAN node of the O-RAN, the particular time and the particular O-RAN node determined by an inference of the AI/ML model; and
a memory coupled to the processing circuitry and configured to store the performance measurements.

2. The apparatus of claim 1, wherein the processing circuitry is further to:
train the AI/ML model based on the performance measurements, to predict traffic demand patterns of a NSSI associated with the NSSI resources at the time determined by the inference.

3. The apparatus of claim 2, wherein the NSSI is activated by a network slice subnet management service provider (NSSMS_P) of the O-RAN based on a request from a network slice subnet management service consumer (NSSMS_C).

4. The apparatus of claim 1, wherein to optimize the allocation of the NSSI resources the processing circuitry is further to:
reconfigure at least one NSSI attribute of a NSSI using the NSSI resources via an O1 interface with an O-RAN node.

5. The apparatus of claim 4, wherein to optimize the allocation of the NSSI resources the processing circuitry is further to:
update cloud resources of a cloud of the O-RAN (O-Cloud) via an O2 interface between the Non-RT RIC and the O-Cloud.

6. The apparatus of claim 1, wherein the NSSI resources include at least one of:
the time determined by the inference;
a location of a RAN node associated with the O-RAN;
a NSSI ID;
one or more slice subnet attributes; and
virtualized network function (VNF) resources update.

7. The apparatus of claim 1, wherein the processing circuitry is further to:
train the AI/ML model based on the performance measurements, to predict traffic demand patterns of a NSSI associated with the NSSI resources at the time determined by the inference; and
reconfigure at least one NSSI attribute of a NSSI using the NSSI resources via an O1 interface with an O-RAN node and update cloud resources of a cloud of the O-RAN (O-Cloud) via an O2 interface between the Non-RT RIC and the O-Cloud to optimize the allocation of the NSSI resources, wherein the NSSI resources include at least one of:
the time determined by the inference;
a location of a RAN node associated with the O-RAN;
a NSSI ID;
one or more slice subnet attributes; and
virtualized network function (VNF) resources update.

8. The apparatus of claim 1, wherein the performance measurements include one or more of:
downlink (DL) physical resource blocks (PRBs) used for data traffic;
uplink (UL) PRBs used for data traffic;
an average DL user equipment (UE) throughput in a next generation Node-B (gNB) of the O-RAN;
an average UL UE throughput in the gNB;
a number of protocol data unit (PDU) sessions requested for setup in the O-RAN;
a number of PDU sessions successfully set up in the O-RAN; and
a number of PDU sessions failed to set up in the O-RAN.

9. The apparatus of claim 1, wherein the performance measurements are received from a plurality of O-RAN nodes, the plurality of O-RAN nodes including one or more of:
an O-RAN Central Unit-Control Plane (O-CU-CP) node;
an O-RAN Central Unit-User Plane (O-CU-UP) node;

an O-RAN Distributed Unit (a-DU) node; and an O-RAN Radio Unit (O-RU) node.

10. The apparatus of claim 1, wherein the processing circuitry is to:

generate an instruction for execution by an O-Cloud Management and Orchestration node, the execution of the instruction causing an update of the NSSI resources.

11. A non-transitory computer-readable storage medium that stores instructions for execution by one or more processors of a Non-Real-Time RAN Intelligent Controller (Non-RT RIC) of a Service Management and Orchestration (SMO) entity of an Open Radio Access Network (O-RAN), the instructions to configure the Non-RT RIC for allocation of network slice subnet instance (NSSI) resources in the O-RAN, and to cause the Non-RT MC to perform operations comprising:

collecting performance measurements related to usage of the NSSI resources;

training an artificial intelligence (AI)/machine learning (ML) model based on the performance measurements; and optimizing the allocation of the NSSI resources at a particular time and a particular O-RAN node of the O-RAN, the particular time and the particular O-RAN node determined by an inference of the AI/ML model.

12. The non-transitory computer-readable storage medium of claim 11, the operations further comprising:

training the AI/ML model based on the performance measurements, to predict traffic demand patterns of a NSSI associated with the NSSI resources at the time determined by the inference.

13. The non-transitory computer-readable storage medium of claim 11, wherein the operations for optimizing the allocation of the NSSI resources further comprise:

reconfiguring at least one NSSI attribute of a NSSI using the NSSI resources via an O1 interface with an O-RAN node.

14. The non-transitory computer-readable storage medium of claim 13, wherein the operations for optimizing the allocation of the NSSI resources further comprise:

updating cloud resources of a cloud of the O-RAN (O-Cloud) via an O2 interface between the Non-RT RIC and the O-Cloud.

15. The non-transitory computer-readable storage medium of claim 11, wherein the NSSI resources include at least one of:

the time determined by the inference;

a location of a RAN node associated with the O-RAN;

a NSSI ID;

one or more slice subnet attributes; and virtualized network function (VNF) resources update.

16. A system comprising:

a Service Management and Orchestration (SMO) entity of an Open Radio Access Network (O-RAN);

a Non-Real-Time RAN Intelligent Controller (Non-RT RIC) coupled to the SMO entity; and processing circuitry coupled to a RAN node of the O-RAN via an O1 interface and a cloud of the O-RAN (O-Cloud) via an O2 interface, wherein to configure the Non-RT RIC for allocation of network slice subnet instance (NSSI) resources in the O-RAN, the processing circuitry to:

collect performance measurements related to usage of the NSSI resources;

train an artificial intelligence (AI)/machine learning (ML) model based on the performance measurements; and optimize the allocation of the NSSI resources at a particular time and a particular O-RAN node of the O-RAN, the particular time and the particular O-RAN node determined by an inference of the AI/ML model.

17. The system of claim 16, wherein the processing circuitry is further to:

train the AI/ML model based on the performance measurements, to predict traffic demand patterns of a NSSI associated with the NSSI resources at the time determined by the inference.

18. The system of claim 16, wherein to optimize the allocation of the NSSI resources the processing circuitry is further to:

reconfigure at least one NSSI attribute of a NSSI using the NSSI resources via an O1 interface with an O-RAN node.

19. The system of claim 18, wherein to optimize the allocation of the NSSI resources the processing circuitry is further to:

update cloud resources of a cloud of the O-RAN (O-Cloud) via an O2 interface between the Non-RT RIC and the O-Cloud.

20. The system of claim 16, wherein the NSSI resources include at least one of:

the time determined by the inference;

a location of a RAN node associated with the O-RAN;

a NSSI ID;

one or more slice subnet attributes; and virtualized network function (VNF) resources update.

* * * * *